United States Patent
Schiff et al.

(10) Patent No.: US 7,991,715 B2
(45) Date of Patent: Aug. 2, 2011

(54) SYSTEM AND METHOD FOR IMAGE CLASSIFICATION

(75) Inventors: Jeremy Schiff, Berkeley, CA (US);
Justin Fiedler, Whitefish Bay, WI (US);
Dominic Antonelli, Berkeley, CA (US);
Heston Liebowitz, Emeryville, CA (US); Neil Warren, Berkeley, CA (US);
Jonathan Burgstone, San Francisco, CA (US); Sharam Shirazi, Atherton, CA (US)

(73) Assignee: Arbor Labs, Inc., Berkeley, CA (US)

( * ) Notice: Subject to any disclaimer, the term of this patent is extended or adjusted under 35 U.S.C. 154(b) by 660 days.

(21) Appl. No.: 12/163,976

(22) Filed: Jun. 27, 2008

(65) Prior Publication Data

US 2009/0172030 A1    Jul. 2, 2009

Related U.S. Application Data

(60) Provisional application No. 61/009,358, filed on Dec. 27, 2007, provisional application No. 61/043,039, filed on Apr. 7, 2008.

(51) Int. Cl.
*G06N 5/00*    (2006.01)
(52) U.S. Cl. ................................... 706/20; 706/45
(58) Field of Classification Search .............. 706/20, 706/45
See application file for complete search history.

(56) References Cited

U.S. PATENT DOCUMENTS

| 5,526,407 A | 6/1996 | Russell et al. |
| 6,801,674 B1 | 10/2004 | Turney |
| 2002/0087599 A1 | 7/2002 | Grant et al. |
| 2002/0103822 A1 | 8/2002 | Miller |
| 2002/0133494 A1 | 9/2002 | Goedken |
| 2003/0212679 A1 | 11/2003 | Venkayala et al. |
| 2006/0087519 A1 | 4/2006 | Berger et al. |
| 2006/0291730 A1 | 12/2006 | Lee et al. |
| 2007/0159522 A1 | 7/2007 | Neven |

FOREIGN PATENT DOCUMENTS

KR    1020050036067    4/2005

OTHER PUBLICATIONS

Chiang, et al., Model-Based Classification of Radar Images, IEEE Transactions on Information Theory, vol. 46, No. 5, Aug. 2000, pp. 1842-1854.*
Yang, et al., Detecting Faces in Images: A Survey, IEEE Transactions on Pattern Analysis and Machine Intelligence, vol. 24, No. 1, Jan. 2002, pp. 34-58.*
Dorko, et al., Selection of Scale-Invariant Parts for Object Class Recognition, Proceedings of the Ninth IEEE International Conference on Computer Vision (ICCV'03), pp. 1-7.*
International Search Report PCT/US2008/068683 dated Oct. 9, 2008.
International Search Report PCT/US2008/066999 dated Nov. 27, 2008.

* cited by examiner

*Primary Examiner* — Wilbert L Starks, Jr.
(74) *Attorney, Agent, or Firm* — Perkins Coie LLP

(57) ABSTRACT

Systems and methods for image classification are disclosed. In one aspect, embodiments of the present disclosure include a method, which may be implemented on a system, of selecting a predetermined number of training images that are representative of images associable with a particular topic category. One embodiment can include, extracting training image features from the training images, generating a set of descriptors characteristic of images associable with the particular topic category, and generating the particular set of predetermined models that correspond to the particular topic category based on the set of descriptors.

27 Claims, 16 Drawing Sheets

SYSTEM AND METHOD FOR IMAGE CLASSIFICATION

CLAIM OF PRIORITY

This application claims priority to U.S. Provisional Patent Application No. 61/009,358 entitled "Method, System, and Apparatus For Automated Digital Media Classification", which was filed on Dec. 27, 2007, the contents of which are expressly incorporated by reference herein.

This application claims further priority to U.S. Provisional Patent Application No. 61/043,039 entitled "Method, System, and Apparatus For Optimizing Online Advertisements Using Analysis of Rich Media Content", which was filed on Apr. 7, 2008, the contents of which are expressly incorporated by reference herein.

TECHNICAL FIELD

The present disclosure relates generally to classification of images.

BACKGROUND

One way of determining which advertisements should be placed on which pages is based on matches with textual data. However, text-based identification and matching limits the relevancy of ad placements. Since the same words can be used in different contexts, depending on the identified text, the advertisement identifier may need to parse through tens of thousands of advertisements which may be relevant. Also, in many contexts, particularly on social-network and photo sharing sites which rely on tagging, there is insufficient text for accurately identifying advertisements. Furthermore, since many related concepts or ideas do not necessarily have the same identifying keywords, some search results or recommendations which are relevant may be missed by the traditional text-based identification means.

DETAILED DESCRIPTION

Figure 1:
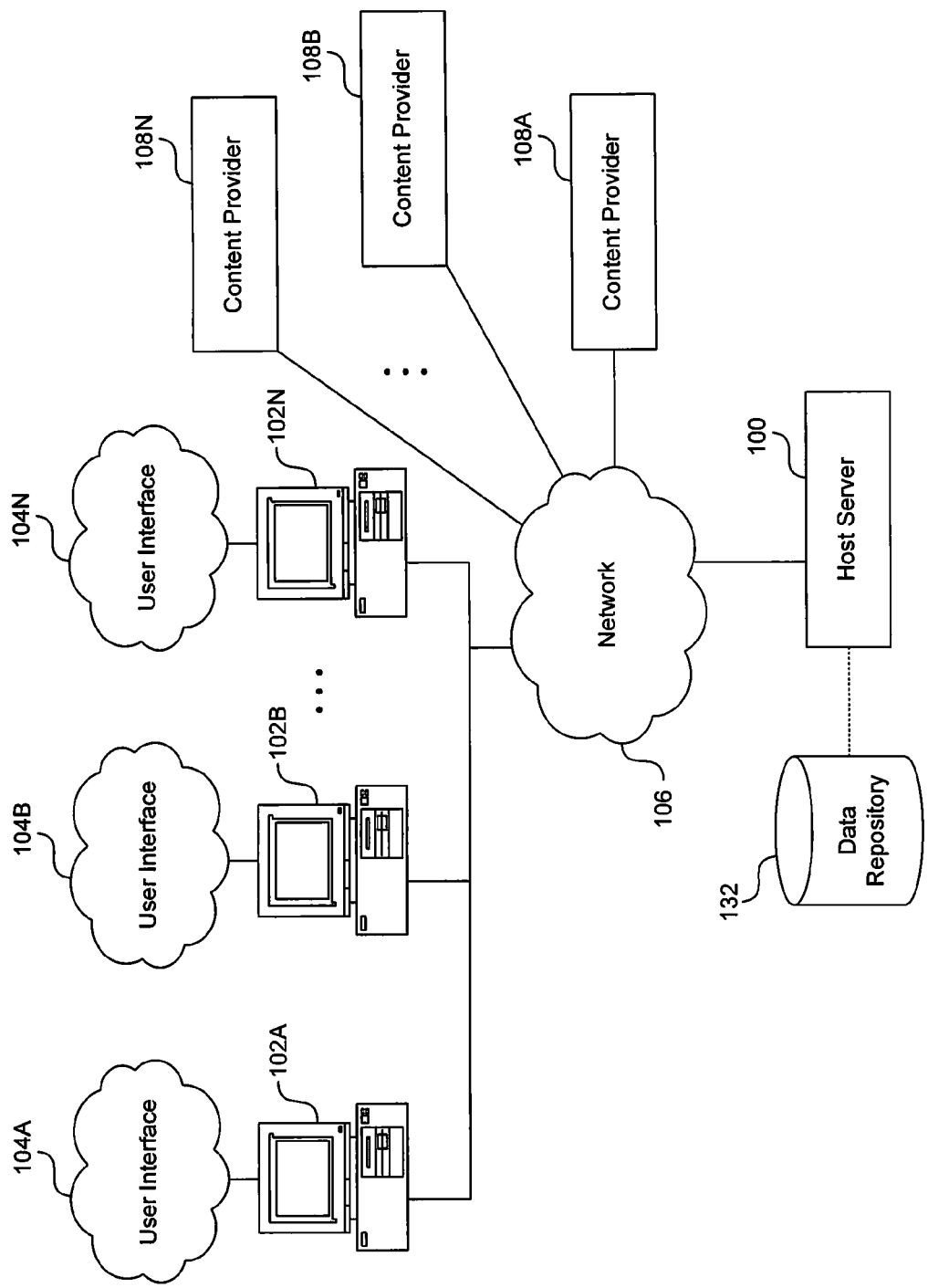
FIG. 1 illustrates a block diagram of a plurality of client devices able to communicate with a plurality of content providers and a server that optimizes advertisement delivery via a network, according to one embodiment.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods for advertisement delivery optimization in a web-based environment.

One aspect of the present disclosure includes identifying and presenting advertisements to a user in a web-based environment based on the presence of multimedia (e.g., rich media, rich content). In some embodiments, targeted advertisement services (e.g., local or remote) are provided to content providers that represent web-publishers. The web-publishers (e.g., PhotoBucket) generally have at their disposal, a large number of advertisements from which they can select and place. Services and functionalities can be provided to the web-publishers to assist them in optimally placing the advertisements on each page.

In one embodiment, images hosted by the web-publisher for display on the website metadata associated with a set of advertisements available to the web-publisher for placement on the website are analyzed. For example, the set of images are analyzed and can be categorized as associable with one or more of the set of predetermined image categories. Thus, based on the analysis, an advertisement suitable for placement on a webpage of the website can be identified, in some instances, for a fee.

Alternatively, targeted advertisement services can be provided to the advertisement database (inventory) of a 3rd party advertising company. For example, a 3rd party advertisement company (e.g., Tribal Fusion) provides advertisements to different web-publishers. The services and functionalities can be applied to the advertisement database of the 3rd party advertising company such that the advertisements provided by the 3rd party advertisement company to each customer can be optimized, for example, using the information provided by performing image classification on the ads and/or on multi-media content existing on webpage.

In one embodiment, a set of images associated with a set of advertisements provided by the third-party advertisement company and customer data of the plurality of customers are analyzed. Thus, an advertisement suitable for a customer of the plurality of customers can be selected based on the analysis. In one embodiment, text-based information related to the set of images or the customer data is analyzed. In general, the text-based information can include metadata and tags.

In one embodiment, a set of predetermined image categories are selected for use in identifying the advertisement. The web-publisher or 3rd party advertisement company may select the predetermined image categories for use in identifying the advertisement. The web-publisher or 3rd party advertisement can also a subset of the set of predetermined image categories for use in identifying the advertisement. In one embodiment, additional categories of the set of predetermined image categories for use in identifying the advertisement to the web-publisher, in some instances, for a fee.

One embodiment further includes, generating a set of custom image categories for the web-publisher. Additionally the set of predetermined image categories are adaptive and modifiable.

Advertisements include any sort of promotional content such as flyers, coupons, e-coupons, delivered via any means including but not limited to, web-based delivery (e.g., email, banner, flash media, multimedia, etc.), telephonic delivery (e.g., via cell phone, via SMS text, via land-line), physical delivery (e.g., via mail, banner display, etc.).

Note that although embodiments of the present disclosure are described with reference to web-based multimedia, it is contemplated that the novel techniques are applicable to multimedia (e.g., images, pictures, videos, text, etc.) existing in a physical environment/surroundings or multimedia presented on a display unit (e.g., cable television, videos, DVDs, etc.) which may or may not be connected to network (e.g., Internet).

In general, multimedia includes, in addition to textual content, audio content, animated content, video content, hypermedia, and/or interactive multimedia, and online advertisement can be optimized based on any combination of the aforementioned types of multimedia.

Multimedia content (e.g., movie content, audio content, type of background music, speech content, image content, flash-media, etc.) can be determined to gauge user interest such that online advertisements of improved relevancy can be presented to the user. For example, if a user is viewing a friend's ski vacation pictures, advertisements relevant to Tahoe ski resorts or ski rentals can be identified and presented to the user. If the user is determined to have a preference for trance music, advertisements and/or content promoting various trance music D.J.s can be identified and presented to the user.

Speech recognition can be employed to identify the content of music, a dialogue, and/or video content. These techniques can further be used in conjunction with detection of textual data (e.g., keywords) to obtain information about the user. Content descriptors can be generated for each type of multimedia to identify a candidate pool of ads most relevant for the user. In addition, user data (e.g., user profile information including but not limited to, age, demographic data, geographical data, etc.) are in some instances used to further refine the candidate pool of ads of potential interest to the user. In addition, general knowledge about users may be detected and compiled. Implicit knowledge about users may be determined based on their detected activities in a web-environment. For example, visitors of an online wine shop could be assumed to be someone who likes wines or is otherwise related to the wine industry.

One aspect of the present disclosure includes generating content descriptors (e.g., content information, content data, and/or content metadata, etc.) from the multimedia that is present in an online environment. The content descriptors may represent different types of attributes of multimedia. For example, descriptors for images (e.g., photographs, artwork, paintings, sketches, hand-written documents, etc.) can include, by way of example but not limitation, color indicators, frequency content indicators, texture indicators, category indicators, shape indicators, etc.

Descriptors for audio content (e.g., speech, sound, music, etc.) can include, by way of example but not limitation, topic of speech, type of sound, tone of sound, frequency content, frequency distribution, genre of music, beat, instrument, etc. Descriptors for video content, for example, can include, color, video quality, category of video, characters in the video, etc. These descriptors can be used alone or in conjunction to identify a candidate pool of advertisement relevant to the user. Descriptors for image content can also be referred to as "features" or "image features".

One aspect of the present disclosure includes using image classification for generating descriptors (e.g., image features) to identify relevant ads. The image classification process is able to identify one or more image categories that the image (e.g., photograph) can be associated with. For example, an image (e.g., drawing, painting, or photograph) of a baby in a ski cap can be associated with both a ski photo and a baby photo. By classifying images into topic categories, the system can identify topics of interest to the user and further select advertisement based on the identified topics of interest. This process typically includes a learning phase, which learns a model given a broad array of images in each category, and then a classification phase, which determines the category of some new media. This process typically includes decomposing each image used in the learning step into a set of features. Then, the set of features and an image category are input into a statistical learning algorithm, which builds a model for classifying an image. When a new image arrives, a system will compute the same features of the image, and use the predetermined model to determine the image category.

Conventional approaches to this problem generally vary by two major categories: 1) the image is decomposed into features, and 2) what learning algorithm is used.

For image decomposition, approaches include using the image pixels directly, constructing statistics over the entire image such as by building color histograms (possibly using other colorspaces such as HSV, LAB, or YCrCb), or histograms of image transformations such as gradients, Gabor Features, Gaussian Edge Detectors, Discrete Fourier Transforms, and many more. Other approaches segment the image into pieces, such as the top left quarter, the top right quarter, etc. and compute image features for each of these sub-regions, and then concatenate all of these features together. This particular approach is referred to as a feature pyramid. These sub-regions can also overlap, for instance the top-left quarter, the top-right quarter, the top-middle (having the same width and height as the top-left or top-right quarter), etc. We could then compute features such as a color histogram for each of these sub-regions. Also, interest point detectors can be used to just compute statistics about patches at points of interest, and ignoring the rest of the image. For example, a feature could be a histogram of the green component of 3×3 patch of pixels at locations where a corner detector exceeds some specific threshold. An important technique is to merge all of these techniques together, allowing us to use spatial, color, interest point, and image-transform features all together, to provide more robust results. For instance, we could use an interest point detector on the top-left quarter of the hue component (after transforming the image to HSV space) of the image. We could then compute a Gabor feature on the 3×3 patch of the points determined as interesting. Other procedures such as image normalization can be used as a pre-processing step to improve robustness. For other applications such as sound, Discrete Fourier Transforms (DFTs) and Discrete Cosine Transforms (DCTs) are common choices for such a decomposition.

For the learning, many methods are available such as K-nearest neighbors (KNN), Support Vector Machines (SVMs), Adaptive Boosting (Adaboost), Neural Networks, Bayesian Learning, etc. Often there are also some parameters which are chosen for the system. For K-nearest neighbors, what distance function, averaging function, and the value of K are all options. For SVMs, what kernel is used can have a large effect on performance. The machine learning process for image classification is described with further reference to FIG. 6 and FIG. 9.

FIG. 1 illustrates a block diagram of a plurality of client devices 104A-N able to communicate with a plurality of content providers 108A-N, 110 and a server 100 that optimizes advertisement delivery via a network, according to one embodiment.

The plurality of client devices 104A-N and content providers 108A-N, 110 can be any system and/or device, and/or any combination of devices/systems that is able to establish a connection with another device, a server and/or other systems. The client devices 104A-N and content providers 108A-N, 110 typically include display or other output functionalities to present data exchanged between the devices to a user. For example, the client devices and content providers can be, but are not limited to, a server desktop, a desktop computer, a computer cluster, a mobile computing device such as a notebook, a laptop computer, a handheld computer, a mobile phone, a smart phone, a PDA, a Blackberry device, a Treo, and/or an iPhone, etc. In one embodiment, the client devices 104A-N and content providers 108A-N, 110 are coupled to a network 106. In some embodiments, the modules may be directly connected to one another.

The network 106, over which the client devices 104A-N and content providers 108A-N, 110 communicate, may be a telephonic network, an open network, such as the Internet, or a private network, such as an intranet and/or the extranet. For example, the Internet can provide file transfer, remote log in, email, news, RSS, and other services through any known or convenient protocol, such as, but is not limited to the TCP/IP protocol, Open System Interconnections (OSI), FTP, UPnP, iSCSI, NFS, ISDN, PDH, RS-232, SDH, SONET, etc.

The network 106 can be any collection of distinct networks operating wholly or partially in conjunction to provide connectivity to the client devices, host server, and/or the content providers 108A-N, 110 and may appear as one or more networks to the serviced systems and devices. In one embodiment, communications to and from the client devices 104A-N and content providers 108A-N, 110 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more wireless networks, such as, but is not limited to, one or more of a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G networks, enhanced data rates for GSM evolution (EDGE), General packet radio service (GPRS), enhanced GPRS, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

The content providers 108A-N are generally advertisers or content promoters who wish to have their advertisements optimally delivered to end users (e.g., users of client devices 102A-N).

The database 132 can store software, descriptive data, multimedia, user data, system information, drivers, and/or any other data item utilized by other components of the host server 100 and/or the content providers 108 for operation. The database 132 may be managed by a database management system (DBMS), for example but not limited to, Oracle, DB2, Microsoft Access, Microsoft SQL Server, PostgreSQL, MySQL, FileMaker, etc.

Figure 3A:
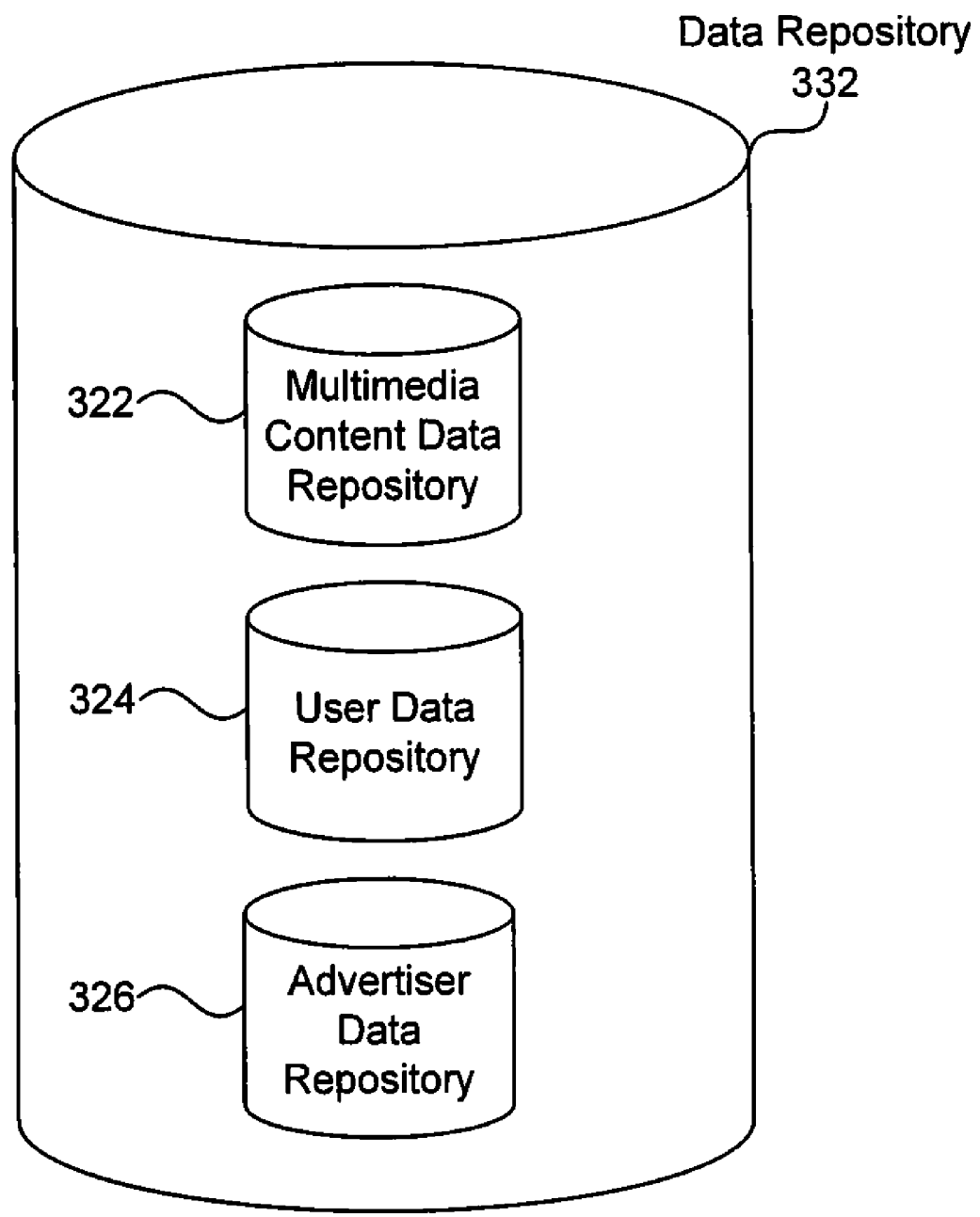
FIG. 3A depicts a block diagram illustrating a database for storing data used for advertisement delivery optimization, according to one embodiment.
Figure 3B:
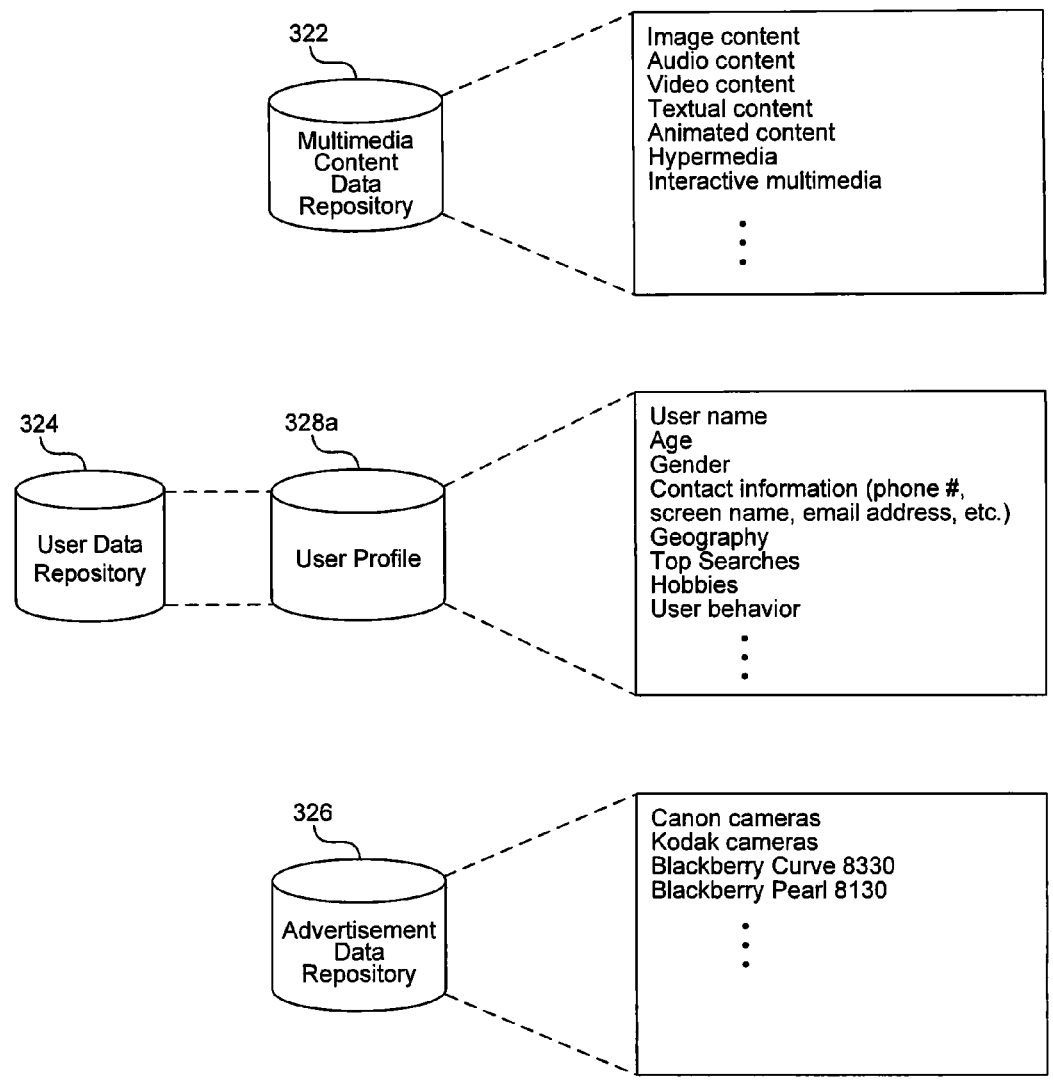
FIG. 3B depicts a block diagram of a database for storing multimedia content, user data, and advertisement depository, according to one embodiment.

The database 132 can be implemented via object-oriented technology and/or via text files, and can be managed by a distributed database management system, an object-oriented database management system (OODBMS) (e.g., ConceptBase, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package. An example set of data to be stored in the database 132 is illustrated in FIG. 3A-3B.

The host server 100 is, in some embodiments, able to communicate with client devices 102A-N and content providers 108A-N via the network 106. In addition, the host server 100 is able to retrieve data from the database 132. In some embodiments, the host server 100 is able to assimilate data obtained from the content providers 108A-N and/or client devices 102A-N to provide enhanced or optimized advertisement delivery.

The communications that the host server 100 establishes with the client-end devices can be multi-way and via one or more different protocols. Any number of communications sessions may be established prior to providing optimized advertisement delivery. Each session may involve multiple users communicating via the same or different protocols. The host server 100 communicates with the participating parties or entities (e.g., client devices, end users, advertisers, content providers, databases, etc.), in series and/or in parallel to obtain the necessary information from the users to identify relevant advertisements. The process of which is described in detail with further reference to FIG. 5-9.

In addition, the host server 100 can establish communication sessions with the database 132 to identify additional information about the users, such as, but not limited to subscription information, historical information, click-through history, user preferences (explicit or implicit), and/or any other useful information which may indicate a user's likes and dislikes.

Figure 2:
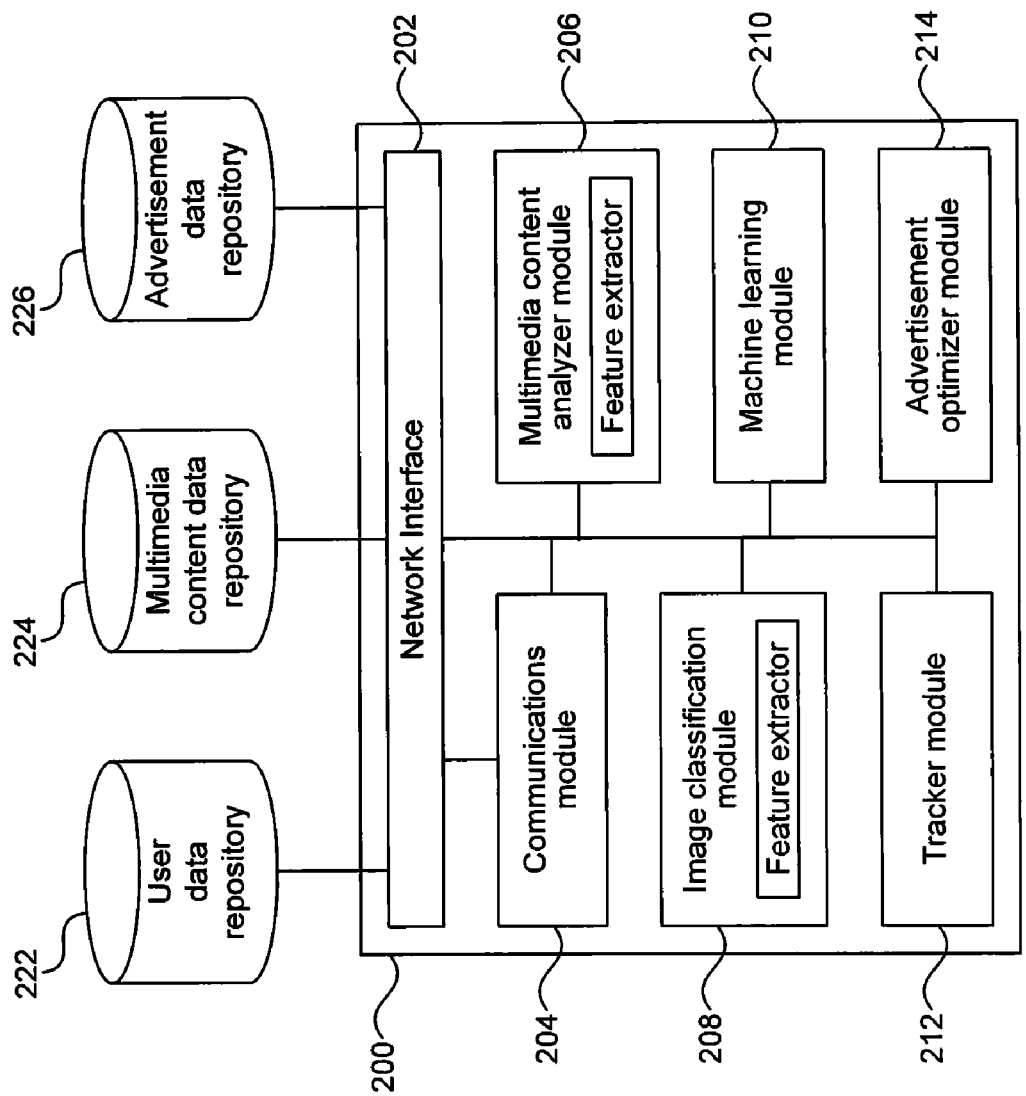
FIG. 2 depicts a block diagram of the components of a host server for advertisement delivery optimization, according to one embodiment.

FIG. 2 depicts a block diagram of the components of a host server 200 for advertisement delivery optimization, according to one embodiment.

The host server 200 includes a network interface 202, a communications module 204, a multimedia content analyzer module 206, an image classification module 208, a machine learning module 210, a rate tracker 212, and/or an advertisement optimizer module 214. Additional or fewer modules can be included without deviating from the novel art of this disclosure. In addition, each module in the example of FIG. 2 can include any number and combination of sub-modules, and systems, implemented with any combination of hardware and/or software modules. The host server 224 may be communicatively coupled to the user database 222, the multimedia content database 224, and/or the advertisement database 226 as illustrated in FIG. 2. In some embodiments, the user database 222, the multimedia content database 224, and/or the advertisement database 226 are partially or wholly internal to the host server 200. The databases are described with further reference to FIG. 3A-B.

The host server 200, although illustrated as comprised of distributed components (physically distributed and/or functionally distributed), could be implemented as a collective element. In some embodiments, some or all of the modules, and/or the functions represented by each of the modules can be combined in any convenient or known manner. Furthermore, the functions represented by the modules can be implemented individually or in any combination thereof, partially or wholly, in hardware, software, or a combination of hardware and software.

In the example of FIG. 2, the network interface 202 can be one or more networking devices that enable the host server 200 to mediate data in a network with an entity that is external to the host server, through any known and/or convenient communications protocol supported by the host and the external entity. The network interface 202 can include one or more of a network adapter card, a wireless network interface card, a router, an access point, a wireless router, a switch, a multilayer switch, a protocol converter, a gateway, a bridge, a bridge router, a hub, a digital media receiver, and/or a repeater.

A firewall, can, in some embodiments, be included to govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions performed or included in the functions of the firewall, can be, for example, but are not limited to, intrusion-prevention, intrusion detection, next-generation firewall, personal firewall, etc. without deviating from the novel art of this disclosure. In some embodiments, the functionalities of the network interface 202 and the firewall are partially or wholly combined and the functions of which can be implemented in any combination of software and/or hardware, in part or in whole.

The network interface 202 includes a communications module or a combination of communications modules communicatively coupled to the network interface 818 to manage a one-way, two-way, and/or multi-way communication sessions over a plurality of communications protocols.

In the example of FIG. 2, the host server 200 includes the communications module 204 or a combination of communications modules communicatively coupled to the network interface 202 to manage a one-way, two-way, and/or multi-way communication sessions over a plurality of communications protocols.

Since the communications module 204 is typically compatible with receiving and/or interpreting data originating from various communication protocols, the communications module 204 is able to establish parallel and/or serial communication sessions with end users and content promoters (e.g., advertisers). The communications module is also able to communicate with one or more of the user database 222, the multimedia content database 224, and/or the advertisement database 226.

Thus, in some embodiments, the communications module 204 receives data and information relevant to providing advertisers with optimized online advertisement delivery services and providing end users with ads of improved relevancy. In addition, the communications module 204 communicates with the end user devices to deliver the identified ads based on multimedia content present in a web-based environment. The data/information received may have originated from various protocols and may be in various formats, including, but not limited to, multimedia content including, text, audio, speech, image, video, hypermedia, etc.

The multimedia content analyzer module 206 can be any combination of software agents and/or hardware modules able to detect, identify, and/or analyze multimedia content present in a web-based environment.

The multimedia content analyzer module 206 (hereinafter referred to as "analyzer module") can detect the presence of multimedia content (e.g., rich media, audio, text, audio, hypermedia, and the like types of media) in a web-based environment that a user is currently viewing or otherwise interacting with. For example, the analyzer module 206 detects and tracks any music tracks that the user may be listening to over the web. Furthermore, the analyzer module 206 may also detect any image content (e.g., pictures, artwork, photographs, abstract images, and the like content . . . ) that the user may be viewing, browsing through, and/or searching for. Additionally, presence of textual content, hypermedia, flash media, and/or interactive media may also be detected and identified as such.

In one embodiment, the analyzer module 206 distinguishes between different types of multimedia and identifies the detected content as text, audio, hypermedia, and the like types of media or a combination thereof. Once multimedia has been identified as a particular type of media, one or more algorithms and/or processes are applied for analysis.

In one embodiment, the analyzer module 206 analyzes the detected multimedia content to obtain features of the content that may be useful for providing optimized advertisement services via identifying ads with higher relevancy to user interests or preferences. These features may be used by the analyzer module 206 to obtain additional information about the multimedia. For example, a general topic/category of the multimedia may be determined, a genre of music, a topic of dialogue, an image category, an image type, etc. The features can additionally be used by the image classification module 208 or the machine learning module 210 to determine additional information about the multimedia content.

In one embodiment, the multimedia content analyzer module 206 includes a feature extractor for extracting multimedia features. Features of audio content include by way of example but not limitation, audio spectrum (time and frequency domain data), type of sound (e.g., human voice, synthetic sound, a cappella, instrumental, female voice, male voice), type of music (e.g., hip-hop, classical, vocal, jazz, etc.), pitch, loudness, Discrete Fourier Transforms (DFTs) and Discrete Cosine Transforms (DCTs), etc. Features of image content can include, for example, color components, edges, distribution of color components, texture, shape, frequency content (e.g., 2D Fourier Transform), etc.

In particular, for image feature extraction generally occurs in an image decomposition process. Feature extraction techniques can further include for example, using the image pixels directly, constructing statistics over the entire image such as by building color histograms (possibly using other color-spaces such as HSV, LAB, or YCrCb), or histograms of image transformations such as gradients, Gabor Features, Gaussian Edge Detectors, Discrete Fourier Transforms, and many more. Other approaches segment the image into pieces, such as the top left quarter, the top right quarter, etc. and compute image features for each of these sub-regions, and then concatenate all of these features together. This particular approach is referred to as a feature pyramid. These sub-regions can also overlap, for instance the top-left quarter, the top-right quarter, the top-middle (having the same width and height as the top-left or top-right quarter), etc. We could then compute features such as a color histogram for each of these sub-regions. Also, interest point detectors can be used to just compute statistics about patches at points of interest, and ignoring the rest of the image. For example, a feature could be a histogram of the green component of 3×3 patch of pixels at locations where a corner detector exceeds some specific threshold. An important technique is to merge all of these techniques together, allowing us to use spatial, color, interest point, and image-transform features all together, to provide more robust results. For instance, we could use an interest point detector on the top-left quarter of the hue component (after transforming the image to HSV space) of the image. We could then compute a Gabor feature on the 3×3 patch of the points determined as interesting. Other procedures such as image normalization can be used as a pre-processing step to improve robustness.

Note that alternate types of multimedia are supported by the analyzer module. Additional, less, or different features associated with alternate, additional, or less types of multimedia are contemplated and compatibility with the host server/analyzer module 206 and considered within the novel art of the techniques herein described.

In one embodiment, statistical parameters of the detected features are computed. For example, the set of features and an image category are input into a statistical learning algorithm, which builds a model for classifying an image. In one embodiment, the machine learning module 210 builds a model for classifying an image based on the statistical parameters. The statistical parameters may be computed by the analyzer module 206 or the machine learning module 210. When a new image arrives, for example, the image classification module 208 computes the features of the image, and uses the model built by the machine learning module 210 to determine the image category.

One embodiment of the host server 200 includes the machine learning module 210. The machine learning module 210 can be any combination of software agents and/or hardware modules able to identify, receive, and/or compute statistical parameters for features of multimedia and build a statistical model from machine learning to identify specific attributes of multimedia content. For example, statistical parameters for image features computed by the analyzer module 206 can be used for machine learning to build a model for image classification into topic categories.

The machine learning module 210 generally employs one or more learning algorithms for model building to achieve image classification, including but not limited to, K-nearest neighbors (KNN), Support Vector Machines (SVMs), Adaptive Boosting (Adaboost), Neural Networks, Bayesian Learning, etc. Often there are also some parameters which are chosen for the learning. For example, for K-nearest neighbors, the distance function, averaging function, and the value of K are adjustable parameters. In some situations, decreasing the value of K may speed things up and increasing K can improve the accuracy. In general, the accuracy improvement increases with K but generally saturates after a certain point and in some instances, may decrease with further increases of K. The distance functions also generally affect speed and/or accuracy. For SVMs, the kernel that is used can be used to tweak performance. Different kernels can have different speeds, and generally there is a tradeoff between speed and accuracy. For some kernels, there are also parameters which can be set, which affect robustness.

In one embodiment, the machine learning module 210 generates predetermined models for classifying images based on a hierarchical method. The hierarchical method fuses multiple binary classifiers into a k-classifier. In general, in a binary classifier, the more likely of two classes can be determined and thus selected. Thus, for multi-class classification, fusing of multiple binary classifiers can be performed.

In one embodiment, the k-classifier is built from results of a generalization accuracy computation. The generalization accuracy computation is, in one embodiment, determined from performing machine learning on a learning data set and recording the accuracy on a verification data set. For example, the training data set can be split into a learning data set and a verification data set. Machine learning can then be performed on the learning data set to generate a model. The accuracy of the model can then be determined by applying the model to the verification data set. By performing a learning process and a verification process, a probability for each pair of categories can be generated.

Alternatively, the training data set can be split in different ways. For example, in a k-fold cross validation process, the training data is split into k sets where (k−1) sets are used as the training data set and a single set is used as the verification data set. Subsequently, a different (k−1) is used for training and a different set is used as the verification data set, and so on. The generalization accuracy for the k-fold cross validation method can then be determined by averaging over the different selections of the (k−1) training data set and the single verification data set.

The probability for each pair of categories obtained from the combination of the learning and verification process can then, in one embodiment, be used to construct a 'tree' to facilitate the multi-classification process. A number of tree construction methods can be used and are contemplated and are not limited to those discussed herein.

For example, the tree construction can occur from the bottom-up or from the top-down. One example of the bottom-up scheme is to merge two categories with the least generalization accuracy and merging them to create a new category (sometimes also referred to as a 'meta-category'). The creation of the new category also implicitly creates a new node with the two original categories as child-categories. Subsequently, in one embodiment, the machine learning process can be performed for the situation where the two categories are treated as one category. The new accuracies for the newly constructed model based on having merged categories are determined.

This process can be repeated iteratively until there are two categories left among which, the better fitting one can be determined therefore yielding a categorization that occurs in an inverse direction. Using the model from the last step that determines one of the two meta-categories at the last phase of the tree construction the test data is likely to be, the same process can be repeated from the top-down starting at the top node of the tree. This is repeated until one category remains. Since the leaves of the tree are categories rather than meta-categories, the remaining category is category determined to be most likely associable with the data in question.

In alternative embodiments, a tree may be force-balanced by combining k/2 categories to generate a first meta-category and repeating the process. The k/2 categories can be selected, in one embodiment, based on the greedy process, where the pairs with the lowest generalization accuracies are selected. Subsequently, the next pair can be selected based on an optimization approach. For example, the pairings can be selected to minimize the sum of the square of the generalization accuracies.

One embodiment of the host server 200 includes the image classification module 208. The image classification module 208 can be any combination of software agents and/or hardware modules able to identify image features and compute the statistical attributes of the image parameters. The image classification module 208, when, in operation, is communicatively coupled to the machine learning module 210 such that the statistical attributes are used as variables in models that have been built in the machine learning module 210 to classify images.

In one embodiment, the machine learning module 210 updates (e.g., refines, enhances) the models based on the output of the image classification module 208. Since the output of the image classification module 208 provides information related to accuracy of the classification, validation images, such as images of known categories that were not used to train the machine learning module 210, are submitted to the image classification module 208 to evaluate the performance of the models on the validation set. The output of the classification module 208 indicating the accuracy of the model can then be used to update learning parameters, or the features used by the machine learning module 210. To update learning parameters, different values can be used to determine how accuracy is affected. For example, the parameters can be increased from an initial value to find the optimal value. In general the accuracy increases with increasing the value of a learning parameter and will sometimes saturate or decrease with further increase in value of the learning parameter. In some situations, different values can be tried randomly to identify an optimal value that yields high accuracy. In one embodiment, learning parameters and the resulting accuracy can be paired to speed up the search process for the optimal parameter value, for example, performing a binary search.

In one embodiment, the image features used in building the models are updated based on evaluation of model performance. Many different image features can be selected to build a model for a particular image category. The feature selection process is, in one embodiment, implemented with the 'greedy formulation', where one feature with the lowest error is initially selected and combined with a second feature that yields the least error, etc. Thus, at each step, each additional feature added to the model is the feature that decreases the error from the previous iteration without the current feature being incorporated into the model. Any number of image features may be added. In alternative embodiments, all features may be used while subsequently removing features which leave the classifier with the highest remaining accuracy one-by-one. Another method includes classifying each feature independently, and then selecting a predetermined number of features. Potentially, heuristics about which features are similar can be inserted, so they are not all selected (e.g., a gradient feature may be preferred over another color feature if multiple color features have already been selected).

In one embodiment, image features are added until the accuracy exceeds a predetermined threshold. For example, if the accuracy threshold is 80%, features are added until the computed accuracy with validation by the classification module 208 is at least 80%. Alternatively, predetermined numbers of image features may be added to build the image model for a particular image category.

Note that the 'greedy formulation' can be similarly applied to features of other types of multimedia (e.g., audio, video, hypermedia, text, etc.) for building a classification model for various types of multimedia. This application is contemplated and also considered to be within the novel art of this disclosure.

In one embodiment, the learning algorithms employed in the machine learning module 210 are selected and updated based on the 'greedy formulation' process. In addition, learner parameters (e.g., Kernel selection for SVM) can be similarly updated and selected. Therefore, the coupling of the image classification module 208 and the machine learning module 210 allows the host system 200 the ability to automatically re-configure as suitable since multiple parameters are adjustable on-demand to achieve a certain accuracy threshold.

In some embodiments, alternate search algorithms including, optimization formulations, linear programming, genetic algorithm, and/or simulated annealing approaches are used in lieu of, or in conjunction with, the greedy formulation to optimize the classification or machine learning processes.

Additionally, to ensure robustness when detecting images of varying scales, orientations, etc., the training images can be slightly altered to create additional images for the purposes of building the models. For example, new images, which are slightly tilted, slightly rotated, and/or scaled versions (e.g., thumbnail versions) can be generated as additional training images. Also, to ensure sensitivity to certain effects such as border effects, new images with borders can be created for training purposes. In one embodiment, border effects can be remove as a part of the pre-processing process.

One embodiment of the host server 200 includes the rate tracker 212. The rate tracker 212 can be any combination of software agents and/or hardware modules able to track user behavior such as the click-through history, conversion rate, etc. For example, the rate tracker 212 tracks click-through history associated with an end user and the click-through rate associated with particular advertisements. When advertisements are selected based on identified multimedia content, their click-through rates can be tracked to further refine the candidate pool of advertisements associated with the identified multimedia. The rate tracker 212, when in operation, communicates with the advertisement optimizer module 214 to provide information related to popularity of the advertisements selected. The advertisement optimizer module 214 can optionally refine the candidate pool of ads based on user behaviors.

One embodiment of the host server 200 includes the advertisement optimizer module 214. The advertisement optimizer module 214 can be any combination of software agents and/or hardware modules able to identify a candidate pool and/or a non-candidate pool of advertisements based on descriptors of multimedia content. The descriptors may be received from the image classification module 208 or the machine learning module 210.

In one embodiment, the advertisement optimizer module 214 communicates with the advertisement repository (e.g., a database) 226 to extract metadata. The metadata can then be compared with the multimedia descriptors such that relevant advertisements can be identified and delivered to a user. In addition, non-relevant advertisement may also be identified such that they are not presented to a user.

FIG. 3A depicts a block diagram illustrating a repository (e.g., a database) 332 for storing data used for advertisement delivery optimization, according to one embodiment.

In the example of FIG. 3A, the repository (e.g., a database) 332 can store information about multimedia content, users, and advertisements. In one embodiment, the repository (e.g., a database) 332 includes a multimedia content repository (e.g., a database) 322, a user repository (e.g., a database) 324, and an advertisement repository (e.g., a database) 326. The repository (e.g., a database)s 322, 324, and 326 may be partially or wholly external to the repository (e.g., a database) 322.

FIG. 3B depicts a block diagram of a multimedia content repository (e.g., a database) 322, a user repository (e.g., a database) 324, and an advertisement repository (e.g., a database) 326, according to one embodiment.

In the example of FIG. 3B, the multimedia content repository (e.g., a database) 322 can store multimedia content and/or information (e.g., descriptors) about multimedia content.

For example, the types of multimedia content include image, audio, video, textual, animated, hypermedia, and/or interactive multimedia. Various descriptors (e.g., descriptors obtained from extracting features from the media) associated with the multimedia may be stored in the repository (e.g., a database) 322 as well. In one embodiment, the image content includes photographs, including but not limited to photographs associated with a particular user. The photographs may be organized into one or more albums. Therefore, the photographs in an album can be analyzed and a descriptor can be generated. In one embodiment, user data about the particular user is compiled based on the descriptor and an advertisement suitable for targeting the particular user can be identified. In addition, a type or category of advertisement suitable for targeting the particular user can be identified. The descriptor can be generated from at least one sub-descriptor associated with a photograph of the collection of photographs.

In general, an album includes any physical or web-based collection of photographs (e.g., digital photograph or a physical picture).

The user repository (e.g., a database) 324 can store user data. For example, user data can include descriptive data of personal information such as, but is not limited to, a first name and last name of the user, a valid email ID, a unique user name, age, occupation, location, education, ethnicity, race, etc. The user information further includes interest information, which may include, but is not limited to, activities, hobbies, professional information, photos, etc.

The advertisement repository (e.g., a database) 326 can store advertisements and/or advertisement data (e.g., advertisement metadata). The advertisement metadata may be used for identifying ads with increased relevancy, for example, via comparison with descriptors retrieved from multimedia content present in a web-based environment.

Figure 4A:
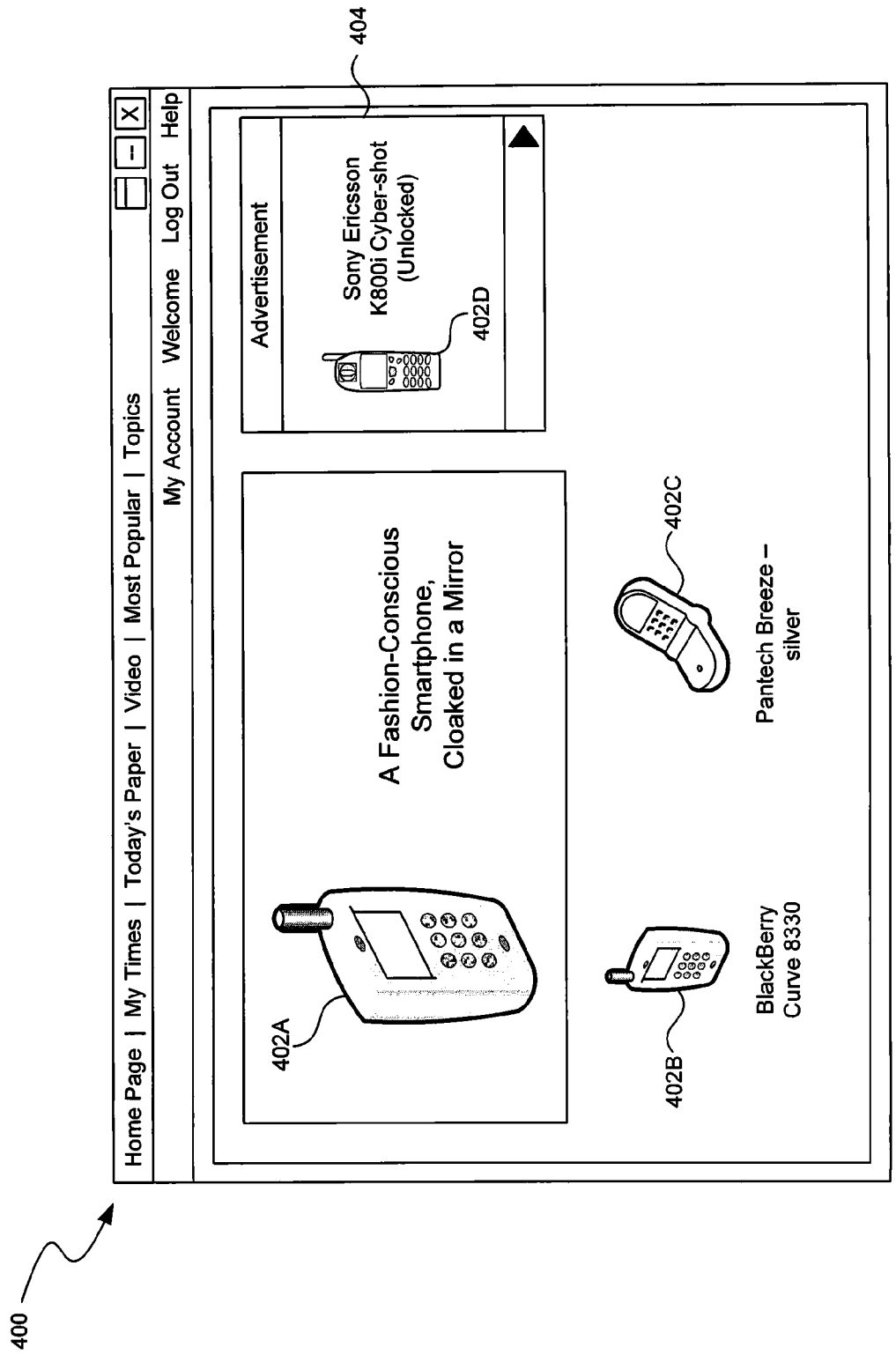
FIG. 4A illustrates an example screenshot of a graphical user interface displaying images of cell phones being viewed by a user and the advertisement thus presented, according to one embodiment.

FIG. 4A illustrates an example screenshot of a graphical user interface 400 displaying images of cell phones 402A-402D being viewed by a user and the advertisement 404 thus presented, according to one embodiment In order to provide a user with advertisements more relevant to pages they are viewing, thus increasing the effectiveness of the advertisements, the system analyzes multimedia content in a web-based environment to identify a candidate pool of advertisements. In the example screen shot of FIG. 4A, a collection of cell phones, 402A-402D with links to reviews and a more in depth description, is displayed on the screen.

The system then analyzes those images 402A-402D present on the webpage and retrieves a set of descriptors that characterize the content being viewed as cell phones. For example the text, phone, cell, or even brand names, could be used as descriptors of this image. Descriptors of the image can also include image features such as color distribution, texture distribution, color content, 2DFT, edges, and/or shapes, etc.

The system then compares the descriptors to metadata associated with a pool of advertisements available for placement. A candidate pool of advertisements is selected from the advertisements available for placement based on how relevant the advertisements are to the multimedia content 402 being accessed. For example, advertisements for cell phones, cell phone accessories, or cell service providers could be placed in the candidate pool because they are relevant to the content being viewed by the user. With the candidate pool of advertisements selected, the system then presents at least some of that candidate pool to the user.

In the example of FIG. 4A, an advertisement 404 of a Sony Ericsson cell phone is presented to the user. In some embodiments, advertisements that are not relevant to the descriptors found by analyzing multimedia content can be placed in a non-candidate pool. The advertisements in this non-candidate pool are generally prevented from being displayed to the user.

Figure 4B:
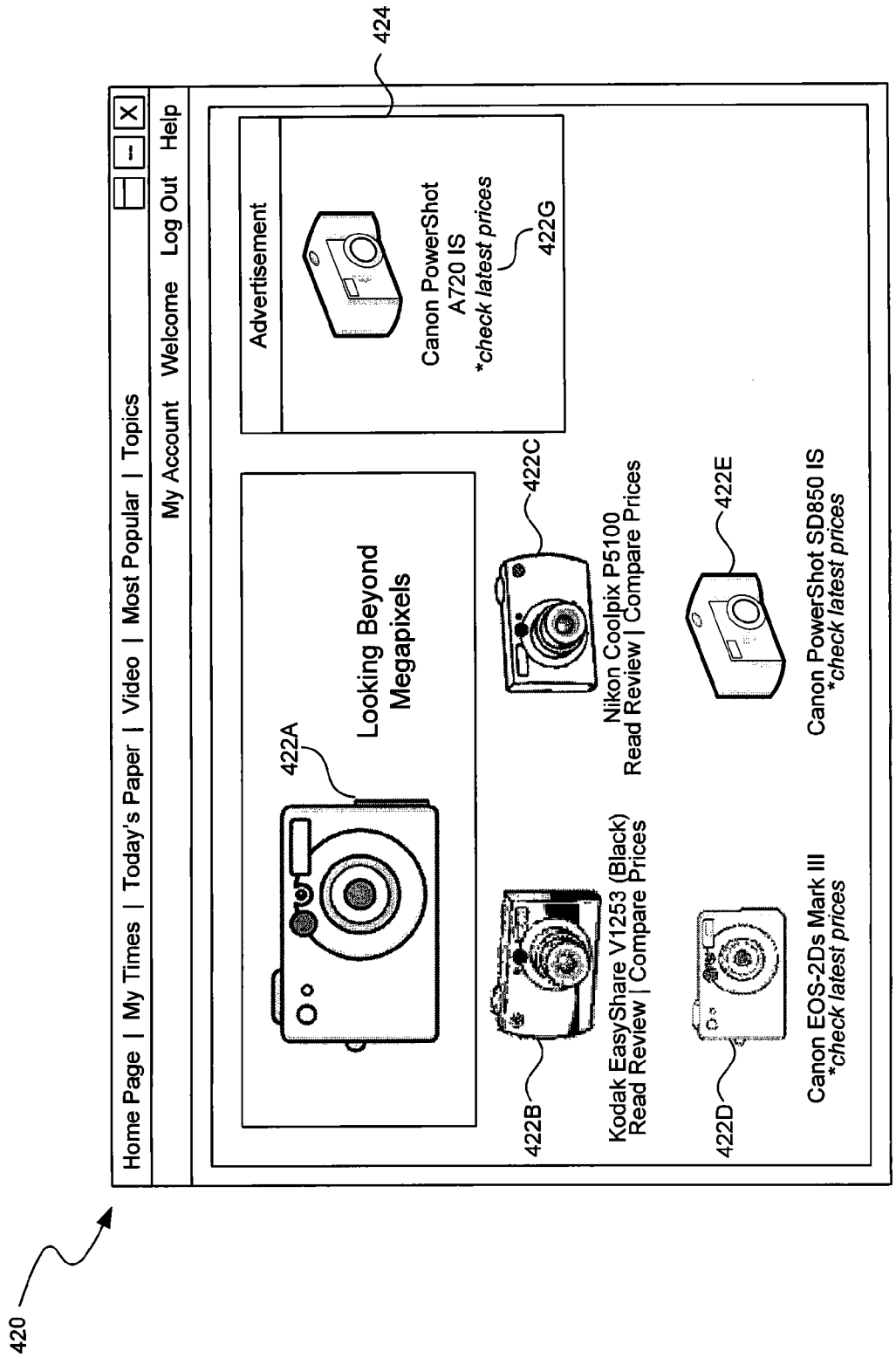
FIG. 4B illustrates an example screenshot of a graphical user interface displaying images of digital cameras being viewed by a user and the advertisement thus presented, according to one embodiment.

FIG. 4B illustrates an example screenshot of a graphical user interface 420 displaying images of digital cameras 422A-422F being viewed by a user and the advertisement 424 thus presented, according to one embodiment.

Similar to the example illustrated in FIG. 4A, the multimedia content is detected, analyzed and a candidate pool of advertisements is selected based on the multimedia content in the web-based environment. Here, the system detects the images 422A-422F being viewed by the user as cameras and an advertisement 424 related to cameras is selected and displayed to the user.

In one embodiment, a unique identifier is assigned to multimedia content (e.g., images 422) that have been analyzed and accordingly categorized, rather than performing the analysis. This unique identifier enables the system to associate the multimedia content with an advertisement, or a candidate pool of advertisements, without having to re-analyze the same image. This may be useful for frequently accessed multimedia content (e.g., a popular song, a popular video clip on YouTube, etc.) since computing and time resources can be conserved. Thus, when the same multimedia content is identified, the system references the unique identifier and is able to automatically identify the set of advertisements that have been previously identified as relevant to the multimedia content. However, in some embodiments, images can be analyzed on-demand in real time as they are detected as being viewed or otherwise accessed.

Figure 4C:
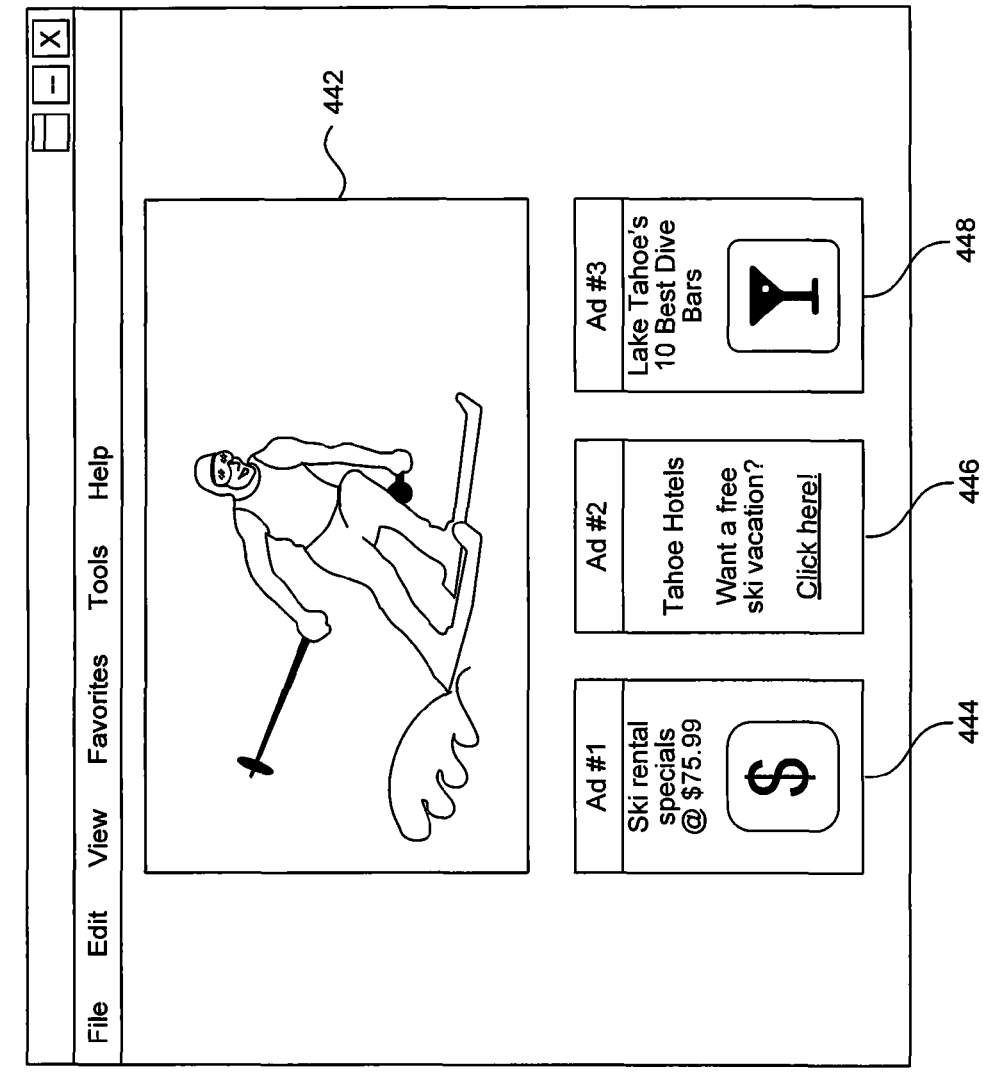
FIG. 4C illustrates an example screenshot of a graphical user interface displaying a photograph being viewed by a user and the advertisements thus presented, according to one embodiment.

FIG. 4C illustrates an example screenshot of a graphical user interface 440 displaying a photograph 442 being viewed by a user and the advertisements 444-448 thus presented, according to one embodiment.

The photograph 442 of a person skiing can be analyzed in a manner similar to the examples of FIG. 4A-4B. For example, image features (e.g., color, shades, frequency content, spatial color distribution, spatial frequency distribution, spatial texture distribution, texture, shapes, edges, etc.) can be extracted from the photograph 442 to be analyzed. In one embodiment, statistical parameters of the image features can be computed and used as variables in predetermined models. The predetermined models include one or more representations of functions that determine the classification of an image based on a set of input variables, in this case, statistical parameters. The comparison can, in one embodiment, facilitate in identification of the category with which the photograph 442 can be associated with.

For example, in a color image (not shown), a predominance of white and blue in a photograph may indicate that the photograph is a skiing picture and a candidate pool of advertisements is created from which several are displayed to the user.

While the above examples show images being analyzed, other types of multimedia content, including but not limited to, textual content, audio content, video content, animated content, interactive multimedia, and hypermedia, can similarly be analyzed. Other methods of analyzing multimedia content can be used to create a candidate pool of relevant advertisements. For example, face detection and recognition, object detection, text recognition, near-by text analysis can be used to further refine the candidate pool of advertisements.

Additionally, in one embodiment, advertisement selection based on multimedia content analysis enables the system to provide brand protection services. For example if the user were accessing content related to a particular brand of product, advertisements particular to that same brand can then be selected for the candidate pool. Brands may be used in analysis of the multimedia content being accessed. For example, if a Coca-Cola® logo is detected in an image, there may be an increased possibility that the image contains an image of a Coke bottle or can. In one embodiment, the candidate pool can be narrowed by removing advertisements which are not of the particular brand being viewed in the multimedia content.

In a further embodiment, inappropriate/unsuitable content (e.g., inappropriate images, nudity, adult content, pornographic videos or images) can be detected in advertisements or multimedia content. For example, if a particular advertiser does not want advertisements displayed adjacent to inappropriate content, the advertisements are not selected when inappropriate content is identified. Additionally, some web-sites do not want advertisements with inappropriate/adult content displayed.

Figure 5:
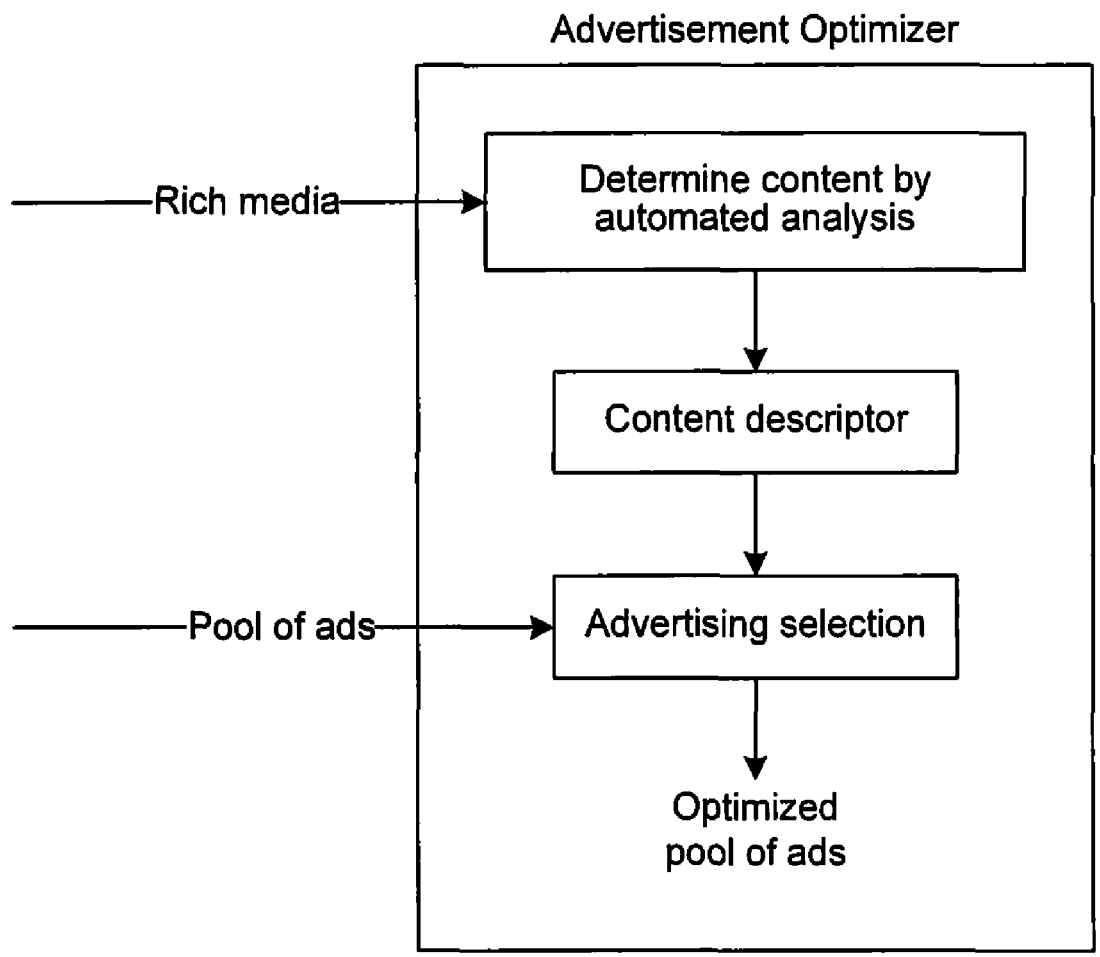
FIG. 5 illustrates a diagrammatic representation of the process for using multimedia content for advertisement selection, according to one embodiment.

FIG. 5 illustrates a diagrammatic representation of the process for using multimedia content for advertisement selection, according to one embodiment.

The content of the multimedia (or rich media) is, in one embodiment, determined by an automatic analysis process. The content can then be represented by one or more content descriptors which are then used to identify an optimized pool of ads.

Figure 6A:
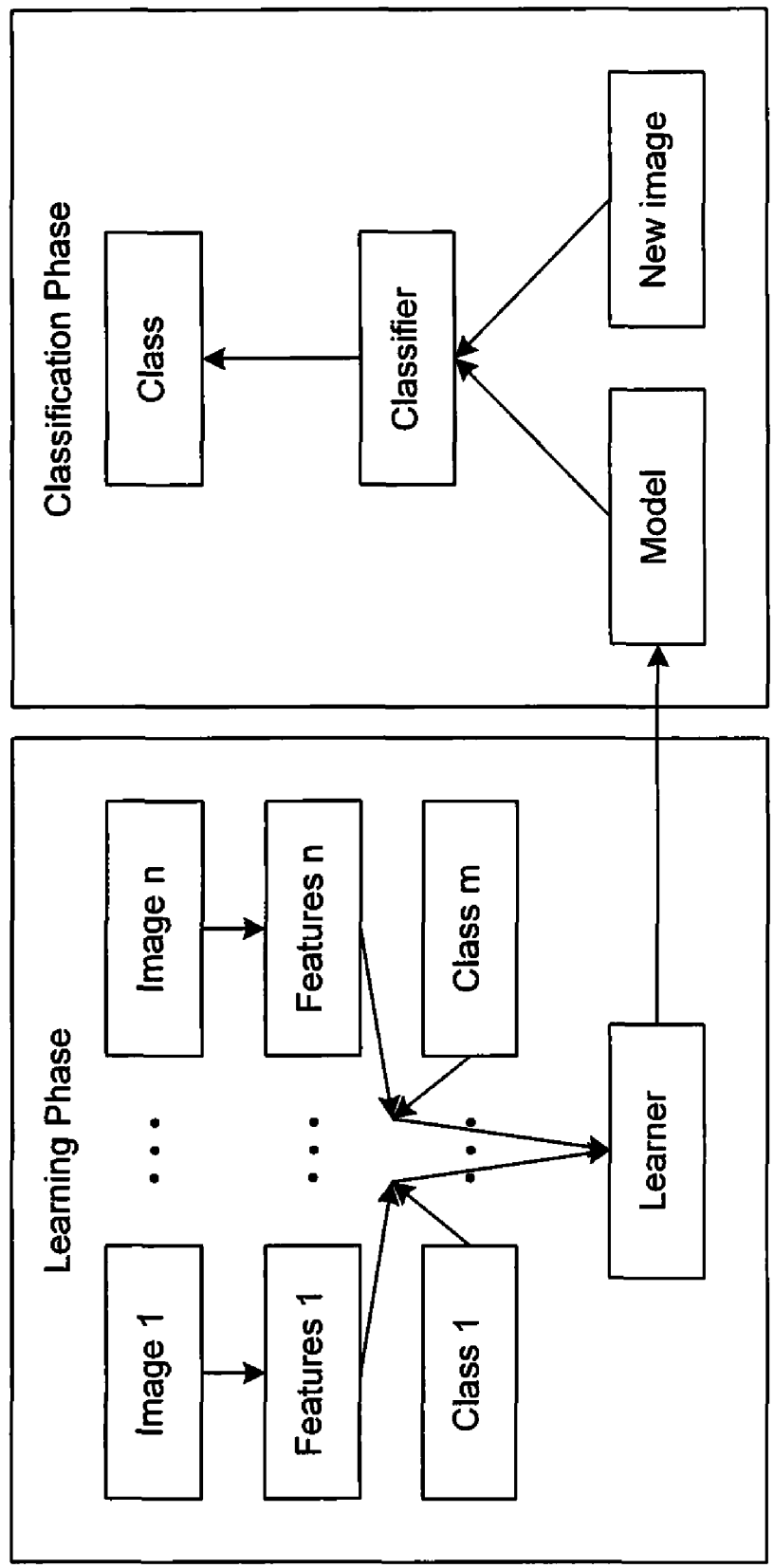
FIG. 6A illustrates a diagrammatic representation of the process of the machine learning process for image classification, according to one embodiment.

FIG. 6A illustrates a diagrammatic representation of the process of the machine learning phase and the classification phase for image classification, according to one embodiment.

Although the flow for image classification is illustrated, this approach can be applied to other forms of multimedia. In one embodiment, the learning phase uses a set of predetermined images associated with a particular category (e.g., class) and extracts image features from the predetermined images. The image features are used with the learner (e.g., in a machine learning process) to produce a model for the particular category. Then, in the classification phase, image features are computed for an unclassified image, and compared with developed models to classify the image of interest.

Figure 6B:
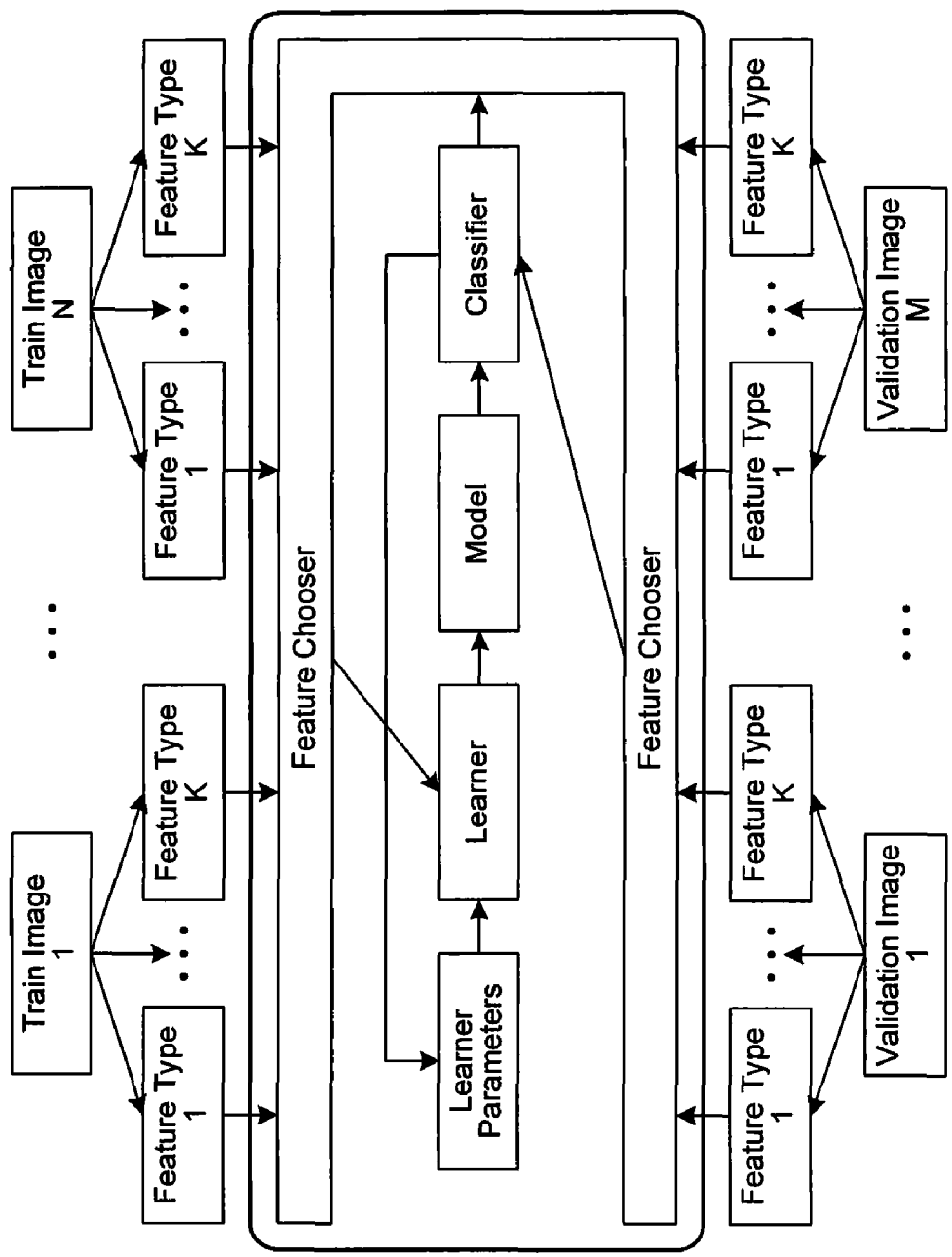
FIG. 6B illustrates a diagrammatic representation of the process of iteratively altering the set of features presented to the learning algorithm in order to improve accuracy and speed of image classification, according to one embodiment.

FIG. 6B illustrates a diagrammatic representation of the process of image classification based on feature extraction with automatic optimization via adjustable feature selections, according to one embodiment.

The example of FIG. 6B provides an enhancement to the process shown in FIG. 6A. In one embodiment, the output of the classification process is used for feature selection in the machine learning process. For example, validation images of known categories are analyzed and classified based on constructed models. Since categories of validation images are known, the accuracy of the models can be determined. Therefore, the results of the validation process, is in one embodiment used to refine the models. For example, the output of the classifier (e.g., indicative of the accuracy of the classification model) can be used to select learning algorithms, learning parameters and/or image features to improve the classification accuracy (e.g., to reach a certain predetermined threshold). The model optimization process is described with further reference to FIG. 2.

Figure 7A:
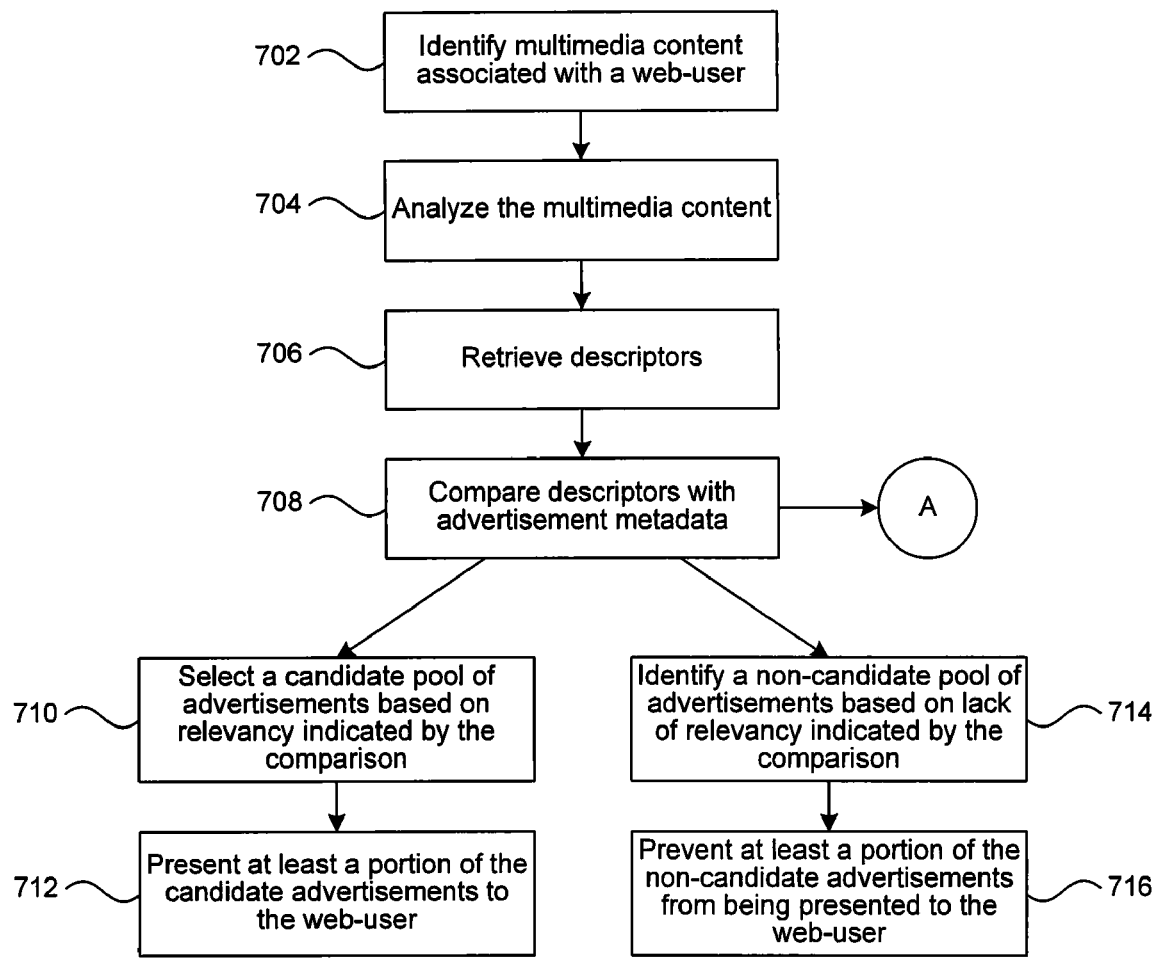
FIG. 7A depicts a flow diagram illustrating a process of selecting candidate and non-candidate pool of advertisements based on identified multimedia content, according to one embodiment.

FIG. 7A depicts a flow diagram illustrating a process of selecting candidate and non-candidate pool of advertisements based on identified multimedia content, according to one embodiment.

In process 702, multimedia content associated with a web-user is identified. Association can be gained by virtue of the user viewing, browsing, searching, listening to, or otherwise interacting with the multimedia content. In process 704, the multimedia content is analyzed. In particular, features may be identified from the multimedia content to facilitate analysis. In process 706, descriptors are identified and/or retrieved from the multimedia content. In process 708, the descriptors are compared with advertisement metadata. A process of using identifiers for multimedia content to identify associated advertisements is described with further reference to FIG. 7B. Advertisement metadata may be provided by the content promoter (e.g., advertiser) or automatically identified from advertisements.

In process 710, a candidate pool of advertisements based on relevancy indicated by the comparison is selected. The relevancy may be indicated qualitatively or quantitatively. For example, the candidate pool of advertisements may be the set with relevancy scores that exceed a certain threshold. Alternatively, the candidate pool of advertisements may be the predetermined number of ads (e.g., top 100, top 500, top 1000, etc.) with the highest relevancy scores.

The candidate pool of advertisements may optionally be further refined before they are presented to the web-user in process 712. In process 714, a non-candidate pool of advertisements based on lack of relevancy indicated by the comparison is optionally identified. The non-candidate pool of advertisements are generally recognized by having low relevancy scores (e.g., scores below a particular threshold) or a predetermined number of lowest scoring ads. In process 716, at least a portion of the non-candidate advertisements are prevented from being presented to the web-user.

Figure 7B:
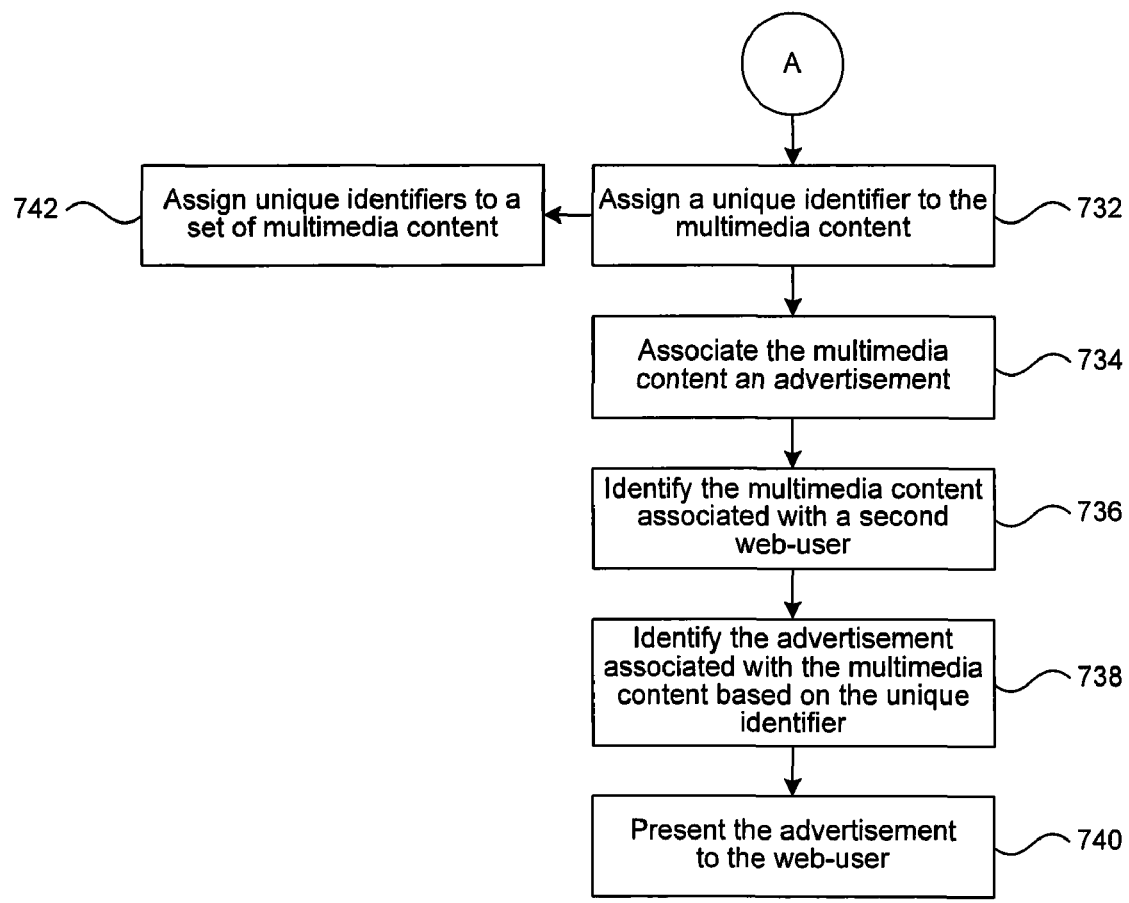
FIG. 7B depicts a flow diagram illustrating a process of using identifiers for multimedia content to identify associated advertisements, according to one embodiment.

FIG. 7B depicts a flow diagram illustrating a process of using identifiers for multimedia content to identify associated advertisements, according to one embodiment.

In process 732, a unique identifier is assigned to the multimedia content. In process 734, the multimedia content is associated with the advertisement that has been identified as being relevant. The advertisement may have been identified based on the process described in FIG. 7A. The unique identifier enables the system to utilize a look-up table such that the same multimedia would not be analyzed twice. If the same content is detected, the associated advertisements can be identified without having to re-analyze the content. This also has the advantage that the time when the media is processed is decoupled from the time it takes from serving the ad, allowing the media to be analyzed in batch.

For example, in process 736, the same multimedia associated with a second web-user is identified. Therefore, the identifier previously assigned to the multimedia content can thus be retrieved. In process 738, the advertisement associated with the multimedia content is identified based on the unique identifier. In process 740, the advertisement is presented to the web-user.

Figure 8A:
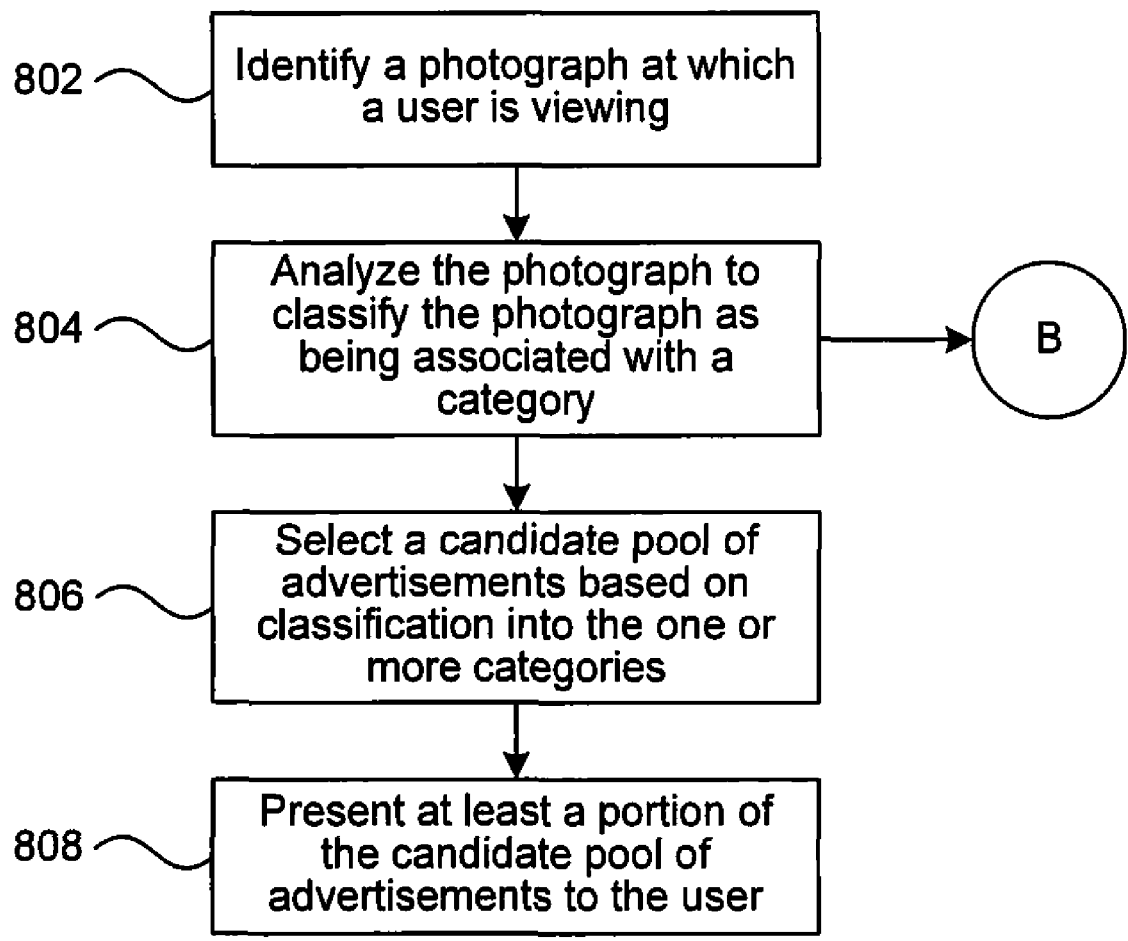
FIG. 8A depicts a flow diagram illustrating a process for selecting candidate pool of advertisements based on category classification of a photograph, according to one embodiment.

FIG. 8A depicts a flow diagram illustrating a process for selecting candidate pool of advertisements based on category classification of a photograph, according to one embodiment.

In process 802, a photograph which a user is viewing is identified. In process 804, the photograph is analyzed to classify the photograph as being associated with a category. The image classification process can be further described with reference to the example of FIG. 8B. In process 806, a candidate pool of advertisements is selected based on classification into the one or more categories. The image categories may be linked to advertisements of particular categories.

In one embodiment, advertisements are linked to a particular image category by tracking click-through history of users viewing image of the particular category. In process 808, at least a portion of the candidate pool of advertisements is presented to the user.

Figure 8B:
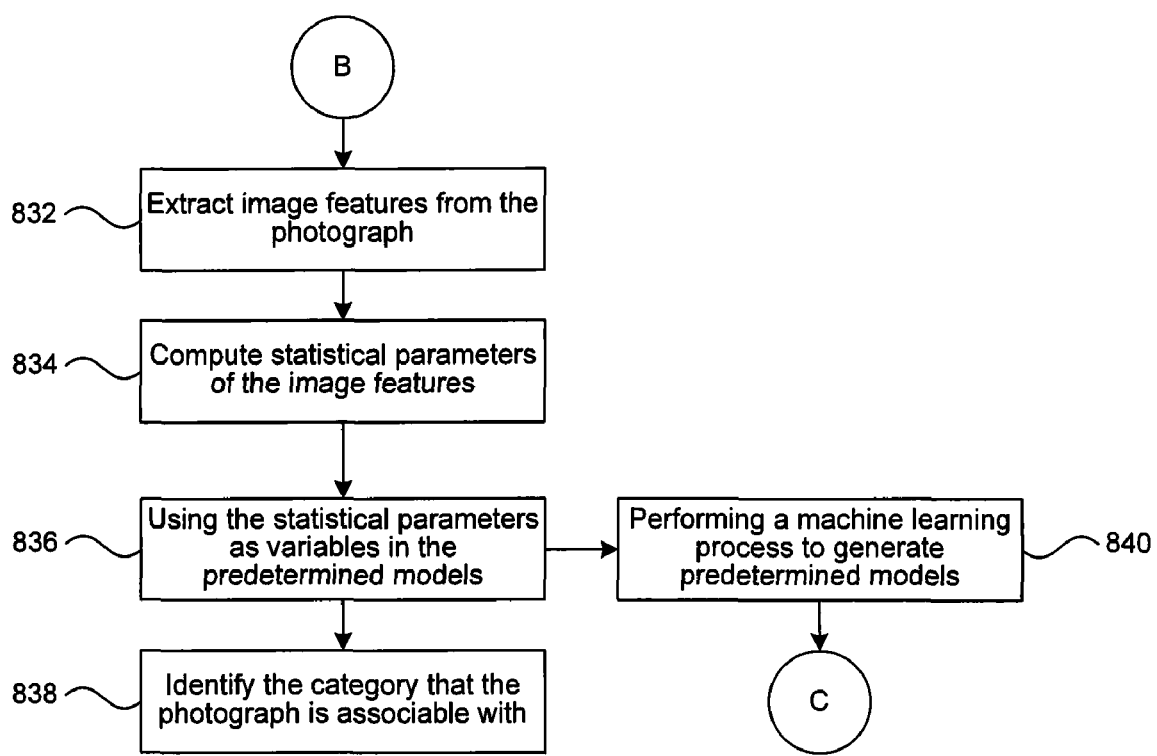
FIG. 8B depicts a flow diagram illustrating a process for category classification of a photograph utilizing a machine learning process, according to one embodiment.

FIG. 8B depicts a flow diagram illustrating a process for category classification of a photograph utilizing a machine learning process, according to one embodiment.

In process 832, image features are extracted from the photograph. In process 834, statistical parameters of the image features are computed. In process 836, the statistical parameters are used as variables in the predetermined models. In one embodiment, the predetermined models are generated via performing machine learning. The machine learning process is illustrated with further reference to FIG. 9A. In process 838, the category that the photograph is associable with is identified.

In one embodiment, probability values that the photograph is associated with the one or more categories are computed. Thus, the order of presenting the at least a portion of the candidate pool of advertisements can be determined based on the probability values.

Figure 9A:
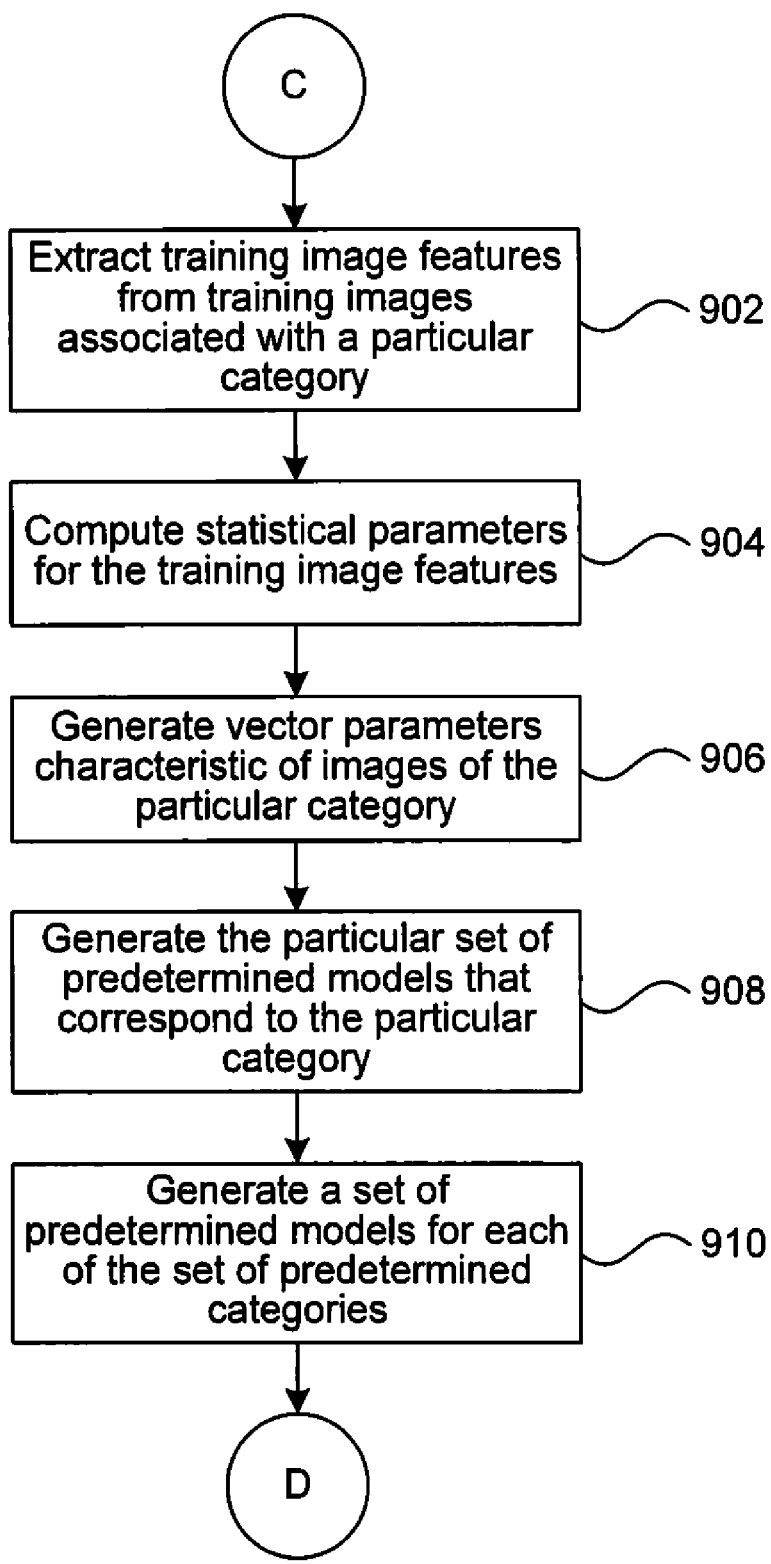
FIG. 9A depicts a flow diagram illustrating a process of machine learning to generate predetermined models to represent functions that can receive as input, characteristics of an image to determine its category, according to one embodiment.

FIG. 9A depicts a flow diagram illustrating a process of machine learning to generate predetermined models to represent functions that can receive as input, characteristics of an image to determine its category, according to one embodiment.

In process 902, training image features are extracted from training images associated with a particular category (or, class). Training image features, similar to image features, include by way of example but not limitation, color, texture, shape, edges, corners, frequency content, spatial distribution, size of features, etc. Some, additional, or all of these features can be extracted. The features that are extracted may be determined on a case-by-case basis or may be specific to image categories. In general, the selected features are adjustable and modifiable as needed.

In process 904, statistical parameters for the training image features are computed. In process 906, descriptors (e.g., text descriptor, numerical descriptor, vector parameters, or more sophisticated data structures such as, a tree, a hash table, matrices, etc.) characteristic of images of the particular category are generated based on the statistical parameters. The descriptors or each entry of a vector or matrix can be generated from statistical parameters in one or more ways. In one embodiment, the statistical parameters can be concatenated to produce a vector. In general, the order and the number of the statistical parameters and the descriptors should be consistent.

For example, in an image including red, green, and blue features, each of which can range from 0-255, a histogram having a predetermined number of measures for each of the features can be constructed. For example, a 2-measure histogram can be generated for the red feature such that pixel values below 122 are counted for the first measure and the pixel values above 122 are counted as the second measure in the histogram. A 2-measure histogram can similarly be constructed for the green feature.

Based on the red and green features, a vector with four parameters can be generated. The first two descriptors are determined from the 2-measured histogram for the red feature and the second two descriptors may be determined from the 2-measured histogram for the green feature. In one embodiment, the histogram entries are normalized to one. For example, the histogram for the red feature and the green feature can be individually normalized to one. Alternatively, the sum of the histogram for the red and green features can be adjusted to sum to one.

In process 908, the particular set of predetermined models that correspond to the particular category is generated. In process 910, a set of predetermined models is generated for each of the predetermined categories. The image classification process based on machine learning is described with further reference to the example of FIG. 9B.

Figure 9B:
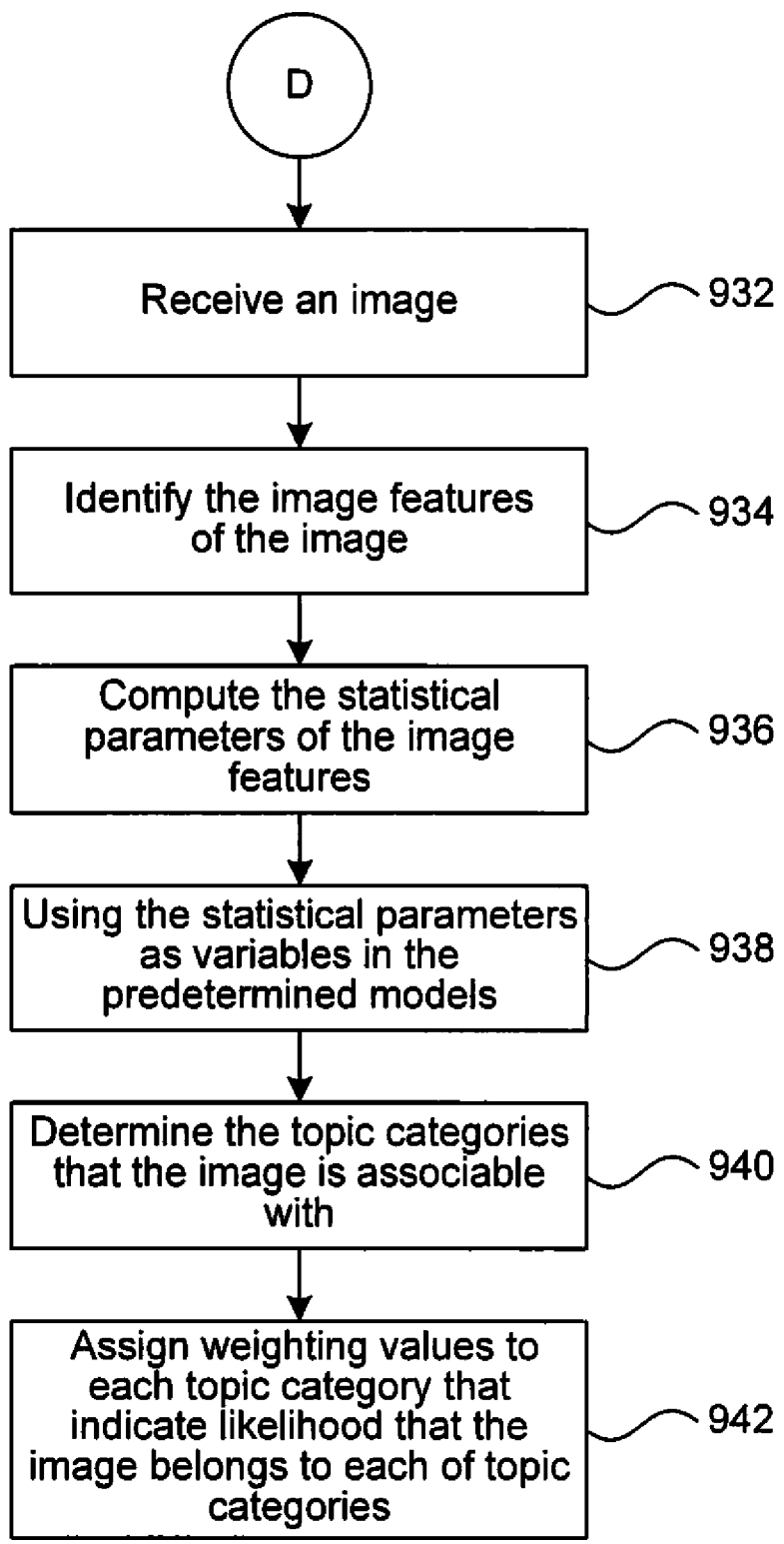
FIG. 9B depicts a flow diagram illustrating a process for classifying images, according to one embodiment.

FIG. 9B depicts a flow diagram illustrating a process for classifying images, according to one embodiment.

In process 932, an image to be classified is received. In process 934, the image features of the image are identified. In process 936, the statistical parameters of the image features are computed. In process 938, the statistical parameters used with the predetermined models. In one embodiment, one or more predetermined models receives the statistical parameters of a particular image and determines the classification.

In process 940, the topic categories that the image is associable with are determined. In process 942, weighting values are optionally assigned to each topic category. The weight values can indicate likelihood that the image belongs to each of topic categories.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other methods, devices, and/or systems, not necessarily to those described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the device may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated.

In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. Accordingly, the inventors reserve the right to add additional claims after filing the application to pursue such additional claim forms for other aspects of the disclosure.

What is claimed is:

1. A method of image classification, comprising:
    selecting a predetermined number of training images that are representative of images associable with a particular topic category;
    extracting training image features from the training images;
    generating a set of descriptors characteristic of images associable with the particular topic category; and
    generating the particular set of predetermined models that correspond to the particular topic category based on the set of descriptors.

2. The method of claim 1, further comprising, computing statistical parameters for at least a portion of the training image features of the set of image features.

3. The method of claim 1, further comprising, generating pluralities of sets of predetermined models for a plurality of topic categories.

4. The method of claim 1, further comprising,
    receiving an image;
    identifying a set of image features of the image;

computing statistical parameters for a portion of the set of image features;

using the statistical parameters as variables in the pluralities of sets of predetermined models; and determining one or more topic categories of the plurality of categories that the image is associable with.

5. The method of claim 4, further comprising, assigning weighting values to each of the one or more topic categories that indicate likelihood that the image belongs to each of the one or more topic categories.

6. The method of claim 1, further comprising, selecting a second set of training images that are variants of the predetermined number of training images associable with the particular topic category.

7. The method of claim 6, wherein the variants comprise one or more of, a scaled version, a thumbnail version, and a rotated version.

8. A system for image classification, comprising:

means for, selecting a predetermined number of training images that are representative of images associable with a particular topic category;

means for, extracting training image features from the training images;

means for, generating a set of descriptors characteristic of images associable with the particular topic category; and means for, generating the particular set of predetermined models that correspond to the particular topic category based on the set of descriptors.

9. A method of classification of an image as associated with one or more categories of a plurality of categories, comprising:

performing machine learning on a learning set of images;

generating a model based on the machine learning of the learning set of images;

determining an accuracy metric of the model using a verification set of images as one or more parameters in the model; and generating a set of probability values; wherein each of the probability value of the set of probability values is generated for a pair of categories based on the accuracy metric.

10. The method of claim 9, further comprising, selecting the learning set of images and the verification set of images.

11. The method of claim 10, wherein, the learning set of images and the verification set of images are selected via a k-fold cross validation process.

12. The method of claim 11, further comprising, generating a tree structure from the set of probability values.

13. The method of claim 12, further comprising, merging n categories of the plurality of categories to create a new category.

14. The method of claim 13, wherein the n categories are associated with the n-lowest probability values of the set of probability values.

15. The method of claim 13, wherein n=2.

16. The method of claim 15, further comprising, generating a revised model based on the machine learning including the new category; and determining an updated accuracy metric of the revised model including the new category.

17. The method of claim 13, further comprising, performing the machine learning including the new category.

18. The method of claim 12, further comprising, selecting at least one category of the plurality of categories associable with the image based on the tree structure.

19. A system for image classification into a plurality of categories, comprising:

means for, performing machine learning on a learning set of images;

means for, generating a model based on the machine learning of the learning set of images;

means for, determining an accuracy metric of the model using a verification set of images as one or more parameters in the model; and means for, generating a set of probability values; wherein each of the probability value of the set of probability values is generated for a pair of categories based on the accuracy metric.

20. The system of claim 19, further comprising, means for, selecting the learning set of images and the verification set of images.

21. The system of claim 20, wherein, the learning set of images and the verification set of images are selected via a k-fold cross validation process.

22. The system of claim 19, further comprising, means for, generating a tree structure from the set of probability values.

23. The system of claim 19, further comprising, means for, merging n categories of the plurality of categories to create a new category.

24. The system of claim 23, further comprising, means for, performing the machine learning including the new category.

25. The system of claim 24, further comprising, means for, generating a revised model based on the machine learning including the new category; and means for, determining an updated accuracy metric of the revised model including the new category.

26. The system of claim 19, wherein the n categories are associated with the n-lowest probability values of the set of probability values.

27. The system of claim 19, further comprising, means for, selecting at least one category of the plurality of categories associable with the image based on the tree structure.

* * * * *